US012678358B2

(12) United States Patent
Ahlqvist et al.

(10) Patent No.: US 12,678,358 B2
(45) Date of Patent: Jul. 14, 2026

(54) CONTACT AND SUPPORT STRUCTURES COMPRISING A PLURALITY OF FINGERS

(71) Applicant: STARFISH OF SWEDEN AB, Malmö (SE)

(72) Inventors: Jonas Ahlqvist, Malmö (SE); Tim Kovac, Anderslöv (SE); Johan Reerslev, Malmö (SE); Daniel Nevala, Malmö (SE); Mikaela Albertsson, Malmö (SE); Rickard Dahan, Limhamn (SE)

(73) Assignee: STARFISH OF SWEDEN AB, Malmö (SE)

( * ) Notice: Subject to any disclaimer, the term of this patent is extended or adjusted under 35 U.S.C. 154(b) by 127 days.

(21) Appl. No.: 18/294,760

(22) PCT Filed: Aug. 4, 2022

(86) PCT No.: PCT/SE2022/050735
§ 371 (c)(1),
(2) Date: Feb. 2, 2024

(87) PCT Pub. No.: WO2023/014268
PCT Pub. Date: Feb. 9, 2023

(65) Prior Publication Data

US 2024/0252375 A1 Aug. 1, 2024

(30) Foreign Application Priority Data

Aug. 6, 2021 (SE) .................................... 2130215-3

(51) Int. Cl.
*A61G 7/057* (2006.01)

(52) U.S. Cl.
CPC ................................ *A61G 7/05707* (2013.01)

(58) Field of Classification Search
CPC ............ A61G 7/05707; A61G 2203/34; A61G 7/057; A47C 27/146; A47C 27/148; A47C 23/0435; A47C 27/062
(Continued)

(56) References Cited

U.S. PATENT DOCUMENTS 4,605,582 A * 8/1986 Sias .................. A61G 7/05707 5/724
4,686,724 A * 8/1987 Bedford ............. A61G 7/05707 5/724
(Continued)

FOREIGN PATENT DOCUMENTS

CN 2824897 Y 10/2006
CN 204092318 U 1/2015
(Continued)

OTHER PUBLICATIONS

Extended European Search Report issued on Jun. 18, 2025 by the European Patent Office in related European Application No. 22853601.7, 7 pages.
(Continued)

*Primary Examiner* — David R Hare
*Assistant Examiner* — George Samuel Gines
(74) *Attorney, Agent, or Firm* — Boone IP Law

(57) ABSTRACT

A support structure for supporting and/or contacting a body or a part of a body. The support structure includes: a base layer having a first surface configured to face the body or part of body and a second surface opposite the first surface, a plurality of fingers extending from the first surface, each finger extending in an axial direction substantially perpendicular to the first surface and having a distal end configured to support the body or part of body, the fingers being arranged at a distance from each other, wherein at least one
(Continued)

finger is more rigid than a deformable portion of the base layer, the deformable portion surrounding the finger.

28 Claims, 16 Drawing Sheets

(58) Field of Classification Search
USPC ........ 5/652
See application file for complete search history.

(56) References Cited

U.S. PATENT DOCUMENTS

| | | | | |
|---|---|---|---|---|
| 4,847,933 | A | 7/1989 | Bedford | |
| 5,153,956 | A | 10/1992 | Nold | |
| 5,452,488 | A | 9/1995 | Reinhardt | |
| 2001/0009043 | A1* | 7/2001 | Langer | A61G 7/0755<br>5/632 |
| 2002/0133105 | A1* | 9/2002 | Dabir | A61H 7/001<br>601/134 |
| 2009/0209889 | A1 | 8/2009 | Li | |
| 2014/0208521 | A1* | 7/2014 | Farnham | A47C 21/042<br>5/724 |
| 2020/0281786 | A1* | 9/2020 | Zwettler | A47C 27/082 |

FOREIGN PATENT DOCUMENTS

| | | | | | |
|---|---|---|---|---|---|
| EP | 2298135 | A1 | * | 3/2011 | A47C 23/002 |
| EP | 2298135 | B1 | | 6/2013 | |
| GB | 921098 | A | | 3/1963 | |
| GB | 2586879 | A | * | 3/2021 | A01K 5/0114 |
| JP | H11266996 | A | | 10/1999 | |
| JP | 2002159375 | A | | 6/2002 | |
| JP | 2002306285 | A | | 10/2002 | |
| JP | 2019063316 | A | | 4/2019 | |
| JP | 2022159375 | A | | 10/2022 | |
| KR | 20180000175 | A | | 1/2018 | |
| KR | 20200124092 | A | * | 11/2020 | A47C 27/22 |
| SE | 1550139 | A1 | | 8/2016 | |
| WO | 1991009584 | A1 | | 7/1991 | |
| WO | 1997017930 | A1 | | 5/1997 | |
| WO | 2006023479 | A2 | | 3/2006 | |
| WO | 2018057878 | A1 | | 3/2018 | |
| WO | 2018119394 | A1 | | 6/2018 | |

OTHER PUBLICATIONS

Swedish Search Report in corresponding Swedish Application No. 2130215-3, mailed on Jul. 1, 2020, 3 pages.
Swedish Official Action in corresponding Swedish Application No. 2130215-3, mailed on Dec. 27, 2021, 8 pages.
International Search Report in corresponding International Application No. PCT/SE2022/050735, mailed on Oct. 28, 2022, 7 pages.
International Preliminary Report on Patentability and Written Opinion in corresponding International Application No. PCT/SE2022/050735, mailed on Oct. 28, 2022, 8 pages.
Diaphragm Design Guidebook, DiaCom Corporation, Rev. 4, vol. 9, 2018, 28 pages.
International Search Report and Written Opinion mailed on Oct. 28, 2022, by the European Intellectual Property Office for International Application No. PCT/SE2022/050735, 6 pages.

* cited by examiner

CONTACT AND SUPPORT STRUCTURES COMPRISING A PLURALITY OF FINGERS

TECHNICAL FIELD

Examples of the present disclosure relate to a support structure intended to be used in or form part of mattresses, pillows, cushions, seats, beds, positioning and/or supporting systems, as well as for dressings.

TECHNICAL BACKGROUND

Long-term pressure on a body or part of a body may affect blood circulation negatively. If the blood circulation is reduced under a longer period of time, a person may suffer from pressure ulcers, also known as bed sores. Long-time pressure, in combination with shear or friction may cause pressure ulcers.

Bed sores may arise when a person is bedridden under a period of time. To prevent bed sores from occurring, the person has to be moved regularly to change position.

Reduced blood circulation may occur in other positions than in decubitus. If a person is sitting for a long time on a surface, for example in a wheelchair, discomfort and problems with blood circulation may occur. If a person needs support to reach an upright position or sitting, long-term contact with a supporting aid may cause both discomfort and poor blood circulation.

A conventional manner to reduce risk for bed sores is to use a foam mattress, which may have a layered structure having different properties.

SE 1550139 discloses a device for seats and reclining seats. In one embodiment, the device comprises a carrier structure and a plurality of circulation modules. The circulation modules comprise a plurality of projections projecting from a bottom portion to support at least one body part. A first side of the bottom portion, configured for abutment against the carrier structure, is convex, i.e., curved outwards.

U.S. Pat. No. 4,605,582 discloses a body support pad for inhibiting occurrence of decubitus ulcers. The body support pad includes a generally planar, flexible base member. A plurality of pillars is arrayed across a lower surface of the base member and extending outwards from the lower surface. A plurality of pods extends outwardly from an upper surface of the base member.

U.S. Pat. No. 4,686,724 discloses an open cell foam pad having a surface ripple cut to create a convoluted surface composed of hills and valleys.

Similar long-term contact with a surface and a part of a body may occur with dressings. To minimize the initiation of decubitus or facilitate healing, reduced contact area with wounds and air flow between solid material and the wound is desired.

SUMMARY

It is an object of at least embodiments of the present disclosure to provide an improvement over the above described techniques and known art.

According to a first aspect of the disclosure, a support structure for supporting and/or contacting a body or a part of a body is provided. The support structure comprises:

- a base layer having a first surface configured to face said body or part of body and a second surface opposite the first surface,
- a plurality of fingers extending from the first surface, each finger extending in an axial direction substantially perpendicular to the first surface and having a distal end configured to support and/or contact said body or part of body, the fingers being arranged at a distance from each other.

At least one finger may be more rigid than a deformable portion of the base layer, the deformable portion surrounding said finger.

In one example, each finger is more rigid than a deformable portion of the base layer, the deformable portion surrounding said finger.

By being more rigid may be understood to reflect that a certain force results in a deformation or displacement of the deformable portion exceeding a deformation or displacement of the finger under the same force in a direction substantially parallel to the axial direction of the finger.

In one example, the fingers extend perpendicular to the first surface.

The deformable portion may surround the finger in direction perpendicular to the axial direction. The deformable portion may extend in a plane parallel to the extension of the base layer.

The base layer may comprise a plurality of said deformable portions and a plurality of intermediary portions from which the fingers extend, the deformable portions being more flexible than the intermediary portions.

The intermediary portion may have a radius extending between the first surface of the base layer and the finger.

A planar extension of the finger in a direction substantially parallel to a plane of the base layer may exceed a height of the finger in a direction substantially perpendicular to the plane of base layer.

A planar extension of the finger in a direction substantially parallel to an extension of the base layer may be less than a height of the finger in a direction substantially perpendicular to the extension of base layer.

The first surface of the base layer and the second surface of the base layer may be substantially co-planar.

Under pressure applied by or on the body or part of body, the plurality of fingers may deflect in a direction substantially perpendicular to an axial direction of the fingers.

Under pressure applied by or on the body or part of body on the fingers, the fingers may be substantially parallel.

Under pressure applied by or on the body or part of body, the deformable portion of the base layer may flex, or may deflect, more than the finger.

Under pressure applied by or on the body or part of body, the deformable portion of the base layer may be elastically deformed.

Under pressure applied by or on the body or part of body, deformation of the deformable portion of the base layer may be exceeding deformation of the finger.

Under pressure applied by or on the body or part of body, deflection of the deformable portion of the base layer may be exceeding deflection of the finger.

Under pressure applied by or on the body or part of body, the deformable portion of the base layer may be displaced in a direction parallel to the axial direction.

Under pressure applied by or on the body or part of body, a displacement of the deformable portion of the base layer in a direction parallel to the axial direction may exceed a compression of the finger in the axial direction. For example, this may be obtained by the fingers being more rigid than the deformable portion.

Under pressure applied by or on the body or part of body, a displacement of the deformable portion of the base layer in a direction perpendicular to the axial direction may exceed a displacement of a distal end of the finger in a direction perpendicular to the axial direction such that adjacent fingers are separated by a distance. Distal ends of adjacent fingers may be separated by a distance.

When no pressure is applied, the deformable portion of the base layer may have a substantially planar extension, and under pressure applied by or on the body or part of body, the deformable portion of the base layer may have a concavely curved shape as seen from the first surface.

Under pressure applied by or on the body or part of body, the fingers may have substantially linear extension in the axial direction.

Under pressure applied by or on the body or part of body, the fingers may be substantially linearly displaced in the axial direction.

The base layer may comprise a base portion and raised portions arranged at a distance from the base portion in direction parallel to the axial direction.

At least one of said plurality of fingers may extend from the raised portion.

Said at least one finger may extend perpendicularly from the raised portion.

The base portion may extend from a perimeter of the raised portions.

The base portion may extend between the raised portions.

The base portion may connect the raised portions to form the base layer.

The raised portion may form the deformable portion of the base layer.

The raised portion may have a polygon shape, such as triangular, quadrilateral such as square or rectangular, pentagon, for example pentagram, hexagon, octagon. The raised portion may have a circular, oval, crescent, asterisk, toroid or obround shape.

Said at least one finger may be arranged at a corner of the raised portion, or may be positioned at a different position than at a corner, for example positioned between two adjacent corners.

At least one finger may be arranged in a first group of fingers extending from a first raised portion of said raised portions, at least one finger may be arranged in a second group of fingers extending from a second raised portion of said raised portions.

A distance between adjacent fingers in the first group may be less than a distance between a finger in the first group to a finger in the second group, adjacent the first group.

A number of fingers in the first group may be 2-12. In one example, a number of fingers in the first group may be 3-12. A number of fingers in second group may be 2-12. In one example, a number of fingers in the second group may be 3-12.

A ratio between a thickness of the deformable portion of the base layer to a length of the finger may be at least 1:2. In one example, a ratio between a thickness of the deformable portion of the base layer to a length of the finger may be at least 1:2 such as in the range 1:2 to 1:10 such as 1:3 to 1:8, for example for a material having a Shore value in the A scale. In one example, a ratio between a thickness of the deformable portion of the base layer to a length of the finger may be at least 1:1 such as in the range 1:1 to 1:5, for example for a material having a Shore value in the 00 or 000 scale. In one example, a ratio between a thickness of the deformable portion of the base layer to a length of the finger may be at least 2:1.

A total area of the distal ends of the fingers may be less than 50% of a total area of the support structure, such that in the range of 5-50% of the total area of the support structure.

A material forming said fingers may have a Shore value measured in the 000 scale. A material forming said fingers may have a Shore value measured in the 00 scale. A material forming said fingers may have a Shore value measured in the 0 scale.

A material forming said fingers may have a Shore value measured in the A scale. A material forming said fingers may have a Shore value measured in the D scale.

A material forming said fingers may have a Shore value exceeding 25-000 (000 Shore scale). In one example of the support structure, a material forming said fingers may have a Shore value in the range of 25-000 to 80-00. A material forming said fingers may have a Shore value exceeding 30-D (D Shore scale). In one example of the support structure, a material forming said fingers may have a Shore value in the range of 30-D to 100-D. In one example of the support structure, a material forming said fingers may have a Shore value in the range of 10-A to 50-A.

The finger may have a substantially circular cross-section having a diameter, wherein a ratio between the diameter at the distal end and a length of the finger may be at least 1:2, such that in the range of 1:2 to 1:10.

The finger may have a substantially circular cross-section having a diameter, wherein a ratio between the diameter at the distal end and a distance between adjacent fingers may be at least 1:2 such as at least 1:3, such that in the range of 1:2 to 1:10. The distance between adjacent fingers may be measured when no pressure is applied.

A ratio between a distance between adjacent fingers to a length of a finger may be at least 1:2, such that in the range of 1:2 to 1:10. The distance between adjacent fingers may be measured when no pressure is applied.

The fingers may have a conical shape.

The fingers may be solid. The fingers may be hollow or tubular.

A surface of the distal end of the finger may have a half-spherical shape. The surface of the distal end of the fingers may be convex.

A surface of the distal end of the finger may have a surface area of at least 3 $mm^2$. In one example, a surface of the distal end of the finger may have a surface area of at least 5 $mm^2$.

The base layer may comprise at least one opening

At least one opening may be provided in the base portion.

At least one opening may be located in the finger or in the raised portion of the base layer.

The deformable portion of the base layer may comprise a plurality of perforations.

Adjacent fingers may be connected by a distancing arm extending from one finger to an adjacent finger.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on or as a layer of a conventional mattress, such as foam mattress. The second surface may be configured to face a conventional mattress, or conventional pillow or cushion.

The support structure may be, or form part of, a pillow or cushion.

The support structure may be, or form part of, a pad or cushion system intended to support a person in a certain position.

The support layer may be part of a matrass or cushion cover.

The support structure may be, or form part of, a dressing.

In one example, a length of the finger may be 5-20 mm. Such example may be when used in a relatively large support structure such as a matrass. In another example, a length of the finger may be 1-10 mm, such as when used as or included in a dressing.

In one example, when pressure of a body or body part is not applied on the support structure, a distance between adjacent fingers may be 5-30 mm. In another example, when pressure of a body or body part is not applied on the support structure, a distance between adjacent finger may be 0.5-10 mm, for example when used as or included in a dressing.

In one example, when pressure from a body or body part is applied on the support structure, a distance between adjacent fingers may be 0.5-30 mm. In another example, when pressure from a body or body part is applied on the support structure, a distance between adjacent fingers may be 0.1-10 mm, for example when used as or included in a dressing.

In one example, the distance between adjacent fingers when pressure from a body or body part is applied on the support structure may correspond to, or substantially correspond to, the distance between adjacent fingers when pressure from a body or body part is not applied on the support structure.

In one example, in a cross-sectional direction of the finger perpendicular to the axial direction, the finger may have an extension of 2.5-15 mm at the distal end. In another example, for example when used as or included in a dressing, in a cross-sectional direction of the finger perpendicular to the axial direction, the finger may have an extension of 0.1-10 mm such as 0.1-2.5 mm at the distal end.

In one example, the finger may have a substantially circular cross-section. A diameter of the finger at the distal end may be 2.5-15 mm. In another example, for example when used as or included in a dressing, the diameter of the finger at the distal end may be 1-5 mm.

The fingers may be integrally formed with the base layer.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The base layer and/or the fingers may be formed of metal, as in the case of stamped or hydraulically formed metal sheet or foil. It may be electroformed. Metal forms may provide the advantage of providing improved heat dissipation.

The base layer and fingers may be separately formed of the same or separate materials and joined to form a finished product of combined base layer and fingers.

The fingers may have a conical shape with a draft angle of at least 2.5°, such that in the range of 2.5° to 25°.

According to a second aspect of the disclosure, a support structure for supporting and/or contacting a body or part of a body is provided. The support structure comprises a base layer comprising raised portions and a base portion extending between the raised portions, at least one finger extending from the raised portion of the base layer, said at least one finger extending in an axial direction substantially perpendicular to the base layer and having a distal end configured to support and/or contact said body or part of body, wherein the raised portions are arranged at a distance from the base portion in a direction parallel to the axial direction.

The fingers may be arranged at a distance from each other.

The base portion may extend from a perimeter of the raised portions.

The base portion may connect the raised portions to form the base layer.

The base portion may continuously extend between the raised portions,

Each finger may be more rigid than the raised portion of the base layer.

The base layer may comprise a plurality of said deformable portions and a plurality of intermediary portions from which the fingers extend, the deformable portions being more flexible than the intermediary portions.

The raised portion may form a deformable portion of the base layer.

The base layer may have a first surface configured to face said body or part of body, and a second surface opposite the first surface and being substantially co-planar with the first surface.

A void or cavity may be formed under said raised portion, on a surface of the base layer facing away from the finger.

The raised portion may be flexible, at least as compared to a flexibility of the finger.

Under pressure applied by or on the body or part of body, deformation of the raised portion may exceed deformation of the finger.

Under pressure applied by or on the body or part of body, the raised portion of the base layer may deflect, or may flex, more than the finger.

Under pressure applied by or on the body or part of body, the raised portion of the base layer may be elastically deformed.

Under pressure applied by or on the body or part of body, a displacement of the raised portion in a direction parallel to the axial direction may exceed a compression of the finger in the axial direction.

Under pressure applied by or on the body or part of body, the fingers may be substantially linear displaced in the axial direction.

Under pressure applied by or on the body or part of body, a displacement of the raised portion in a direction perpendicular to the axial direction may exceed a displacement of a distal end of the finger in a direction perpendicular to the axial direction, such that adjacent fingers are separated by a distance. Distal ends of adjacent fingers may be separated by a distance.

More than one finger may extend from a single raised portion.

At least one finger may be arranged in a first group of fingers extending from a first of said raised portions, and at least one finger may be arranged in a second group of fingers extending from a second of said raised portions.

Fingers extending from the same raised portion may form a group of fingers.

A number of fingers in the first group may be 2-12. In one example, a number of fingers in the first group may be 3-12. A number of fingers in second group may be 2-12. In one example, a number of fingers in second group may be 3-12.

A distance between adjacent fingers in one group may be less than a distance between fingers not belonging to the same group.

The raised portion may have a polygon shape, such as triangular, quadrilateral such as square or rectangular, pentagon, for example pentagram, hexagon, octagon. The raised portion may have a circular, oval, crescent, asterisk, toroid or obround shape.

Said at least one finger may be arranged at a corner of the raised portion, or may be positioned at a different position than at a corner, for example positioned between two adjacent corners.

The raised portion may be arranged at a distance of 1-10 mm from the base portion as measured in a direction parallel to the axial direction. In one example, the raised portion may be arranged at a distance of 5-50 mm from the base portion.

The finger and/or raised portions may be provided with at least one opening.

The base portion may be provided with at least one opening.

The fingers may be integrally formed with the base layer.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The fingers may have a conical shape with a draft angle of at least 2.5°, such that in the range of 2.5° to 25°.

The fingers may have a conical shape.

The fingers may be solid. The fingers may be hollow or tubular.

A surface of the distal end of the finger may have a half-spherical shape. The surface of the distal end of the fingers may be convex.

A surface of the distal end of the finger may have a surface area of at least 3 $mm^2$. In one example, a surface of the distal end of the finger may have a surface area of at least 5 $mm^2$.

A total area of the distal ends of the fingers may be less than 50% of a total area of the support structure, such that in the range of 5-50% of the total area of the support structure.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support layer may be part of a matrass cover or cushion cover.

The support structure may be, or form part of, a pad or cushion system intended to support a person in a certain position.

The support structure may be, or form part of, a dressing.

According to a third aspect of the disclosure, a support structure for supporting and/or contacting a body or part of a body is provided. The support structure comprises:

- a base layer having a first surface configured to face said body or part of body, and a second surface opposite the first surface,
- wherein the base layer comprises a first set of openings extending between the first surface and the second surface,
- a plurality of fingers extending from the first surface, each finger extending in an axial direction substantially perpendicular to the first surface and having a distal end configured to support and/or contact said body or part of body, the fingers being arranged at a distance from each other,
- a second set of openings arranged in the fingers, or in raised portions of the base layer, wherein the second set of openings are arranged at distance from the first set of openings in a direction parallel to the axial direction.

The first surface of the base layer and the second surface of the base layer may be substantially co-planar with the first surface.

A least one finger may be more rigid than a deformable portion of the base layer, the deformable portion surrounding said finger.

In one example, each finger may be more rigid than a deformable portion of the base layer, the deformable portion surrounding said finger.

The base layer may comprise a plurality of said deformable portions and a plurality of intermediary portions from which the fingers extend, the deformable portions being more flexible than the intermediary portions.

Under pressure applied by or on the body or part of body, the deformable portion of the base layer may flex, or may deflect, more than the finger.

Under pressure applied by or on the body or part of body, the deformable portion of the base layer may be elastically deformed.

The deformable portion of the base layer may be a raised portion of the base layer.

A raised portion of the base layer may extend at a distance from a base portion of the base layer in a direction parallel to the axial direction. The base portion may extend between the raised portions. The fingers may extend perpendicularly from the raised portions.

At least one finger may be arranged in a first group of fingers extending from a first of said raised portions, and at least one finger may be arranged in a second group of fingers extending from a second of said raised portions.

A distance of adjacent fingers in the first group may be less than a distance between a finger in the first group to a finger in the second group, adjacent the first group.

A number of fingers in the first group and/or second group may be 2-12. In one example, a number of fingers in the first group and/or second group may be 3-12.

The raised portion may have a polygon shape, such as triangular, quadrilateral such as square or rectangular, pentagon, for example pentagram, hexagon, octagon. The raised portion may have a circular, oval, crescent, asterisk, toroid or obround shape.

Said at least one finger may be arranged at a corner of the raised portion, or may be positioned at a different position than at a corner, for example positioned between two adjacent corners.

The base layer, or a base portion of the base layer, may have a substantially planar extension when no pressure is applied to the support structure.

The raised portion may be flexible, at least in view of the finger.

Under pressure applied by or on the body or part of body, deformation of the deformable portion of the base layer may exceed deformation of the finger.

Under pressure applied by or on the body or part of body, a displacement of the portion of the deformable portion of the base layer in a direction parallel to the axial direction may exceed a compression of the finger in the axial direction.

Under pressure applied by or on the body or part of body, a displacement of the deformable portion of the base layer in a direction perpendicular to the axial direction may exceed a displacement of a distal end the finger in a direction perpendicular to the axial direction, such that adjacent fingers are separated by a distance. Distal ends of adjacent fingers may be separated by a distance.

The fingers may be integrally formed with the base layer.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The fingers may have a conical shape with a draft angle of at least 2.5°, such that in the range of 2.5° to 25°.

A surface of the distal end of the finger may have a surface area of at least 3 $mm^2$. In one example, a surface of the distal end of the finger may have a surface area of at least 5 $mm^2$.

A total area of the distal ends of the fingers may be less than 50% of a total area of the support structure, such that in the range of 5-50% of the total area of the support structure.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support structure may be, or form part of, a pad or cushion system intended to support a person in a certain position. The support layer may be part of a matrass cover or cushion cover.

The support structure may be, or form part of, a dressing.

According to a fourth aspect of the disclosure, a support structure for supporting and/or contacting a body or part of a body is provided. The support structure comprises a base layer having a first surface configured to face said body or part of body, and a second surface opposite the first surface, a plurality of fingers extending from the first surface, each finger extending in an axial direction substantially perpendicular to the first surface and having a distal end configured to support and/or contact said body or part of body, the fingers being arranged at a distance from each other, wherein the fingers are arranged in groups of fingers.

The finger may have a substantially circular cross-section having a diameter, wherein a ratio between the diameter at the distal end and a length of the finger is at least 1:2 such as at least 1:3, such that in the range of 1:2 to 1:10.

The finger may have a substantially circular cross-section having a diameter, wherein a ratio between the diameter at the distal end and a distance between adjacent finger is at least 1:2, such that in the range of 1:2 to 1:10. The distance between adjacent fingers may be measured when no pressure is applied.

A ratio between a distance between adjacent fingers to a length of a finger to may be at least 1:1 such as at least 1:2, such that in the range of 1:1 to 1:10. The distance between adjacent fingers may be measured when no pressure is applied.

In one example, a length of the finger may be 5-20 mm. Such example may be when used in a relatively large support structure such as a matrass. In another example, a length of the finger may be 1-10 mm, such as when used as or included in a dressing.

In one example, when pressure of a body or body part is not applied on the support structure, a distance between adjacent fingers may be 5-30 mm. In another example, when pressure of a body or body part is not applied on the support structure, a distance between adjacent fingers may be 0.5-10 mm, for example when used as or included in a dressing.

In one example, when pressure from a body or body part is applied on the support structure, a distance between adjacent fingers may be 0.5-30 mm. In another example, when pressure from a body or body part is applied on the support structure, a distance between adjacent fingers may be 0.1-10 mm, for example when used as or included in a dressing.

In one example, the distance between adjacent fingers when pressure from a body or body part is applied on the support structure may correspond to, or substantially correspond to, the distance between adjacent fingers when pressure from a body or body part is not applied on the support structure.

In one example, in a cross-sectional direction of the finger perpendicular to the axial direction, the finger may have an extension of 2.5-15 mm at the distal end. In another example, for example when used as or included in a dressing, in a cross-sectional direction of the finger perpendicular to the axial direction, the finger may have an extension of 0.1-5 mm at the distal end, such as 1-2.5 mm.

In one example, the finger may have a substantially circular cross-section. A diameter of the finger at the distal end may be 2.5-15 mm. In another example, for example when used as or included in a dressing, the diameter of the finger at the distal end may be 0.1-5 mm such as 1-2.5 mm.

The first surface of the base layer and the second surface of the base layer may be substantially co-planar.

A distance between adjacent fingers arranged in a first group of fingers may be less than a distance between a finger in the first group to a finger arranged in a second group of fingers.

The base layer may continuously extend between the groups of fingers.

At least one finger may be more rigid than a deformable portion of the base layer, the deformable portion surrounding said finger.

In one example, each finger is more rigid than a deformable portion of the base layer, the deformable portion surrounding said finger.

The base layer may comprise a plurality of said deformable portions and a plurality of intermediary portions from which the fingers extend, the deformable portions being more flexible than the intermediary portions.

The deformable portion of the base layer may be a raised portion of the base layer.

The fingers may be extending from a raised portion of the base layer in a direction parallel to the axial direction.

A base portion may extend between the raised portions.

At least one finger may be arranged in a first group of fingers extending from a first of said raised portion, and at least one finger may be arranged in a second group of fingers extending from a second of said raised portion.

A distance of adjacent fingers in the first group may be less than a distance between a finger in the first group to a finger in the second group, adjacent the first group.

A number of fingers in the first group may be 2-12. In one example, a number of fingers in the first group may be 3-12. A number of fingers in the second group may be 2-12. In one example, a number of fingers in the second group may be 3-12.

The raised portion may have a polygon shape, such as triangular, quadrilateral such as square or rectangular, pentagon, for example pentagram, hexagon, octagon. The raised portion may have a circular, oval, crescent, asterisk, toroid or obround shape.

Said at least one finger may be arranged at a corner of the raised portion, or may be positioned at a different position than at a corner, for example positioned between two adjacent corners.

A ratio between a thickness of the deformable portion of the base layer to a length of the finger may be at least 1:2. In one example, a ratio between a thickness of the deformable portion of the base layer to a length of the finger may be at least 1:2 such as in the range 1:3 to 1:8, for example for a material having a Shore value in the A scale. In one example, a ratio between a thickness of the deformable portion of the base layer to a length of the finger may be at least 1:1 such as in the range 1:1 to 1:5, for example for a material having a Shore value in the 00 or 000 scale. In one example, a ratio between a thickness of the deformable portion of the base layer to a length of the finger may be at least 2:1.

A total area of the surfaces of the distal ends of the fingers may be less than 50% of a total area of the support structure. The total area of the surfaces of the distal ends of the fingers may be exceeding 10% of a total area of the support structure. The total area of the surfaces of the distal ends of the fingers may be between 10-50% such as between 20-30% of a total area of the support structure.

A material forming said fingers may have a Shore value measured in the 000 scale. A material forming said fingers may have a Shore value measured in the 00 scale. A material forming said fingers may have a Shore value measured in the 0 scale.

A material forming said fingers may have a Shore value measured in the A scale. A material forming said fingers may have a Shore value measured in the D scale.

A material forming said fingers may have a Shore value exceeding 25-000 (000 Shore scale). In one example of the support structure, a material forming said fingers may have a Shore value in the range of 25-000 to 80-00. A material forming said fingers may have a Shore value exceeding 50-D (D Shore scale). In one example of the support structure, a material forming said fingers may have a Shore value in the range of 50-D to 100-D.

The fingers may be integrally formed with the base layer.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The fingers may have a conical shape with a draft angle of at least 2.5°, such that in the range of 2.5° to 25°.

The finger/fingers may have a conical shape.

The finger/fingers may be solid. The fingers may be hollow or tubular.

A surface of the distal end of the finger may have a half-spherical shape. The surface of the distal end of the fingers may be convex.

The base layer, or a base portion of the base layer, may have a substantially planar extension when no pressure is applied to the support structure.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support structure may be, or form part of, a pad or cushion system intended to support a person in a certain position.

The support layer may be part of a matrass cover or cushion cover.

The support structure may be, or form part of, a dressing.

According to a fifth aspect of the disclosure, a support structure for supporting and/or contacting a body or a part of a body is provided. The support structure comprises

- a base layer having a first surface configured to face said body or part of body, and a second surface opposite the first surface,
- a plurality of fingers extending from the first surface, each finger extending in an axial direction substantially perpendicular to the first surface and having a distal end configured to support and/or contact said body or part of body, the fingers being arranged at a distance from each other,
- wherein a deformable portion of the base layer surrounding the finger is provided with a perforations.

The hole structure may be intended to increase the flexibility of the deformable portion of the base layer. The deformable portion of the base layer may be flexible, at least in view of the finger.

At least one finger may be more rigid than the deformable portion.

In one example, each finger may be more rigid than the deformable portion.

The base layer may comprise a plurality of said deformable portions and a plurality of intermediary portions from which the fingers extend, the deformable portions being more flexible than the intermediary portions.

The base layer may comprise a plurality of said deformable portions and a plurality of intermediary portions from which the fingers extend, the deformable portions being more flexible than the intermediary portions.

The perforations may comprise a plurality of slots. The slots may be arranged in a pattern. The slots may extend between the first surface and the second surface of the base layer.

The first surface and the second surface of the base layer may be substantially co-planar with the first surface.

The deformable portion of the base layer may be a raised portion of the base layer. The raised portions may extend from a base portion of the base layer, wherein the base portion may extend between the raised portions.

The raised portion may be provided with the perforations.

The base layer, or a base portion of the base layer, may have a substantially planar extension when no pressure is applied to the support structure.

Under pressure applied by or on the body or part of body, deformation of the deformable portion of the base layer may exceed deformation of the finger.

Under pressure applied by or on the body or part of body, a displacement of the deformable portion of the base layer in a direction parallel to the axial direction may exceed a compression of the finger in the axial direction.

Under pressure applied by or on the body or part of body, a displacement of the deformable portion of the base layer in a direction perpendicular to the axial direction may exceed a displacement of a distal end the finger in a direction perpendicular to the axial direction, such that adjacent fingers are separated by a distance. Distal ends of adjacent fingers may be separated by a distance.

A material forming the finger may have a different Shore value than a material forming the base layer.

The support structure may be, or form part of, a dressing.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support layer may be part of a matrass cover or cushion cover.

The support structure may be, or form part of, a pad or cushion system intended to support a person in a certain position.

According to a sixth aspect, a support structure for supporting and/or contacting a body or a part of a body is provided. The support structure comprises

- a base layer having a first surface configured to face said body or part of body, and a second surface opposite the first surface,
- a plurality of fingers extending from the first surface, each finger extending in an axial direction substantially perpendicular to the first surface and having a distal end configured to support and/or contact said body or part of body, the fingers being arranged at a distance from each other,
- wherein adjacent fingers are connected by a distancing arm extending from one finger to an adjacent finger.

The distancing arm may be configured to increase the rigidity of the fingers.

The first surface and the second surface of the base layer may be substantially co-planar with the first surface.

Fingers connected by distancing arms may form a group of fingers. The group may for example have a may have a polygon shape, such as triangular, quadrilateral such as square or rectangular, pentagon, for example pentagram, hexagon, octagon. The group may have a circular, oval, crescent, asterisk, toroid or obround shape.

Said at least one finger may be arranged at a corner of the group, or may be positioned at a different position than at a corner, for example positioned between two adjacent corners.

At least one finger may be more rigid than a deformable portion of the base layer, the deformable portion surrounding said finger.

In one example, each finger may be more rigid than a deformable portion of the base layer, the deformable portion surrounding said finger.

The base layer may comprise a plurality of said deformable portions and a plurality of intermediary portions from which the fingers extend, the deformable portions being more flexible than the intermediary portions.

The base layer, or a base portion of the base layer, may have a substantially planar extension when no pressure is applied to the support structure.

Under pressure applied by or on the body or part of body, deformation of the deformable portion of the base layer may exceed deformation of the finger.

Under pressure applied by or on the body or part of body, a displacement of the deformable portion of the base layer in a direction parallel to the axial direction may exceed a compression of the finger in the axial direction.

Under pressure applied by or on the body or part of body, a displacement of the deformable portion of the base layer in a direction perpendicular to the axial direction may exceed a displacement of a distal end the finger in a direction perpendicular to the axial direction, such that adjacent fingers are separated by a distance. Distal ends of adjacent fingers may be separated by a distance.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support structure may be, or form part of, a pad or cushion system intended to support a person in a certain position.

The support layer may be part of a matrass cover or cushion cover.

The support structure may be, or form part of, a dressing.

According to a seventh aspect of the disclosure, a support structure for supporting and/or contacting a body or a part of a body is provided. The support structure comprises

- a base layer having a first surface configured to face said body or part of body, and a second surface opposite the first surface,
- a plurality of fingers extending from the first surface, each finger extending in an axial direction substantially perpendicular to the first surface and having a distal end configured to support and/or contact said body or part of body, the fingers being arranged at a distance from each other,
- wherein at least along an edge of the support structure, the distal ends of fingers arranged adjacent said edge has a surface area exceeding a surface area of distal ends of fingers arranged a centre portion of the support structure.

The seventh aspect of the disclosure may be combined with any of the above described aspects.

The fingers at the edge may have a different shape than the fingers at the centre portion of the support structure.

A surface of the distal ends of the fingers along the edge may have an elongated shape, for example having an extension transverse to the edge.

Fingers having a larger distal end area may be arranged along two opposite edges of the support structure. Fingers having a larger distal end area may be arranged along the perimeter of the support structure At least one finger may be more rigid than a deformable portion of the base layer, the deformable portion surrounding said finger.

In one example, each finger may be more rigid than a deformable portion of the base layer, the deformable portion surrounding said finger.

The base layer may comprise a plurality of said deformable portions and a plurality of intermediary portions from which the fingers extend, the deformable portions being more flexible than the intermediary portions.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure may be, or form part of, a mattress. In one example, the support structure is arranged on conventional mattress, such as foam mattress.

The support structure may be, or form part of, a pillow or cushion.

The support structure may be, or form part of, a pad or cushion system intended to support a person in a certain position.

The support layer may be part of a matrass cover or cushion cover.

The support structure may be, or form part of, a dressing.

According to an eight aspect of the disclosure, a support structure for supporting and/or contacting a body or a part of a body is provided. The support structure comprises

- a base layer having a first surface configured to face said body or part of body, and
- a plurality of fingers extending from the first surface, each finger extending in an axial direction substantially perpendicular to the first surface and having a distal end configured to support and/or contact said body or part of body, the fingers being arranged at a distance from each other,
- wherein along a first edge of the base layer, the base layer is provided with openings extending from the first surface to the second surface, the openings being configured to receive fingers arranged along an edge of an adjacent support structure, or fingers arranged on an adjacent device to connect the support structure to an adjacent support structure or to an adjacent device.

Such an adjacent device may be a foamed element, a frame element, a structural element, a cushioning element, a cover system, etc. Such an adjacent device may be a part of, or form part of, an adjacent support structure. The adjacent support structure may be of a type disclosed with reference to any of the aspects.

The first support structure and/or the adjacent support structure may be of any one of the aspects of the disclosure above.

At least one finger may be more rigid than a deformable portion of the base layer, the deformable portion surrounding said finger.

In one example, each finger may be more rigid than a deformable portion of the base layer, the deformable portion surrounding said finger.

The base layer may comprise a plurality of said deformable portions and a plurality of intermediary portions from which the fingers extend, the deformable portions being more flexible than the intermediary portions.

The support structure may be moulded in one part, such as being injection-moulded.

The base layer and/or the fingers may be formed of a polymeric material. The base layer and/or the fingers may be formed of a thermoplastic material. The base layer and/or the fingers may be formed of an elastomer, for example a thermoplastic elastomer. The base layer and/or the fingers may be formed of silicone rubber. The polymeric material may be foamed.

In one example, the base layer and/or the fingers may be formed from pulp and fibre materials, and/or plant-based materials. Deflections in the base layer may be provided by slots or perforations which enable elastic deflection.

Combinations of materials are also considered. For example, fingers, raised portions of the base layer, base layer and base portion may be of different materials. A layered structure is also considered, as coatings applied on a base material, for example a metal layer assembled or deposited or electroformed to improve dissipation of heat.

The base layer may comprise an upper layer and a lower layer. A thickness of the upper layer may be different from a thickness of the lower layer. The thickness of the upper layer may be less than the thickness of the lower layer. The upper layer and the lower layer may in one example be co-planar. The upper layer may be adapted to face the body or part of body to be supported. The lower layer may be adapted to face an underlying structure. The lower layer may be foamed. The lower layer may layer may contribute to resisting displacement of the upper layer in a direction parallel to the axis of the fingers. The upper layer may behave as a diaphragm/membrane.

In one example, the second surface of the base layer may be provided with a plurality of fingers, for example fingers of the above described type. The second surface of the base layer of a first support structure of the above described type may be adapted to face a second support structure of the above described type. Fingers of the first support structure may interlockingly engage with spaces between fingers of the second support structure. Fingers of the second support structure may have a corresponding shape and configuration as fingers of the first support structure.

The support structure system may be, or form part of, a mattress. In one example, the support structure system is arranged on conventional mattress, such as foam mattress.

The support structure system may be, or form part of, a pillow or cushion.

The support layer may be part of a matrass cover or cushion cover.

The support structure system may be, or form part of, a pad or cushion system intended to support a person in a certain position.

In one aspect of the disclosure, a support structure for supporting and/or contacting a body or a part of a body is provided. The support structure comprises a base layer having a first surface configured to face said body or part of body and a second surface opposite the first surface. The support structure comprises at least one first portion and at least one second portion. In said at least one first portion, a first type of fingers extend from the base layer, and in said at least one second portion comprises a second type of fingers extend from the base layer, the first type being different from the second type.

The first type of fingers or projections may be different from the second type of fingers in size, shape, structure, design, material, hardness, and/or rigidity.

In this aspect, the fingers are configured to support different parts of a body.

The first type of fingers may be any one of the fingers described above. The second type of fingers may any one of the fingers described above, although being different from the first type.

In one example, an extension of the finger of the second type in a plane being parallel to the base layer may exceed a height of the finger of the second type.

In one example, an extension of the finger of the second type in a direction being substantially parallel to an extension the base layer may be less than a height of the finger of the second type in a direction substantially perpendicular to the extension of the base layer.

In one example, a height of the finger of the first type in a direction being substantially perpendicular to an extension the base layer may exceed an extension of the finger of the first type in a direction substantially parallel to the extension of the base layer.

A surface area of a top surface of the finger of the second type may exceed a surface area of a top surface of the finger of the first type. The top surface may be intended to contact a body, or part of body.

The fingers of the second type may be configured to support a part of a body being more sensitive to high pressure.

The fingers of the second type may be hollow. The fingers of the first type may be solid.

The fingers of the second type may be more flexible compared to the fingers of the first type.

In one aspect of the disclosure, a support structure is provided. The skin structure may be configured for contacting skin, directly or indirectly. A support structure comprises a base layer having a first surface and a second surface, opposite the first surface, a plurality of fingers extending from the first surface of the base layer, wherein each finger has a distal end configured to form a skin contacting surface, wherein the base layer, as seen in cross section, has an undulating shape having undulations, wherein each finger extends from a crest portion of an undulation of the base layer.

In this aspect of the disclosure, the support structure may be, or may form part of, a dressing.

The undulating shape may be sine wave shaped.

The base layer may be provided with at least one opening, wherein said at least opening extends between the first surface and the second surface of the base layer at a trough portion of the undulation of the base layer.

At least the distal ends of the fingers may be adhesive.

The fingers may extend from the base layer in a direction substantially perpendicular to the base layer.

The fingers may be more rigid than the crest portion of the undulations of the base layer.

The base layer may be flexible in a direction substantially parallel to the extension of the fingers.

The base layer may be flexible in a direction substantially perpendicular to the extension of the fingers.

When pressure is applied on the fingers, the fingers may be configured to deflect in a direction substantially perpendicular to an axial direction of the fingers.

When pressure is applied on the fingers, deflection of the crest portion of the undulation of the base layer may exceed deflection of the finger, in a direction substantially parallel to the axial direction of the fingers.

When pressure is applied on the fingers, a displacement of the crest portion of the undulation of the base layer in a direction substantially parallel to the axial direction of the fingers may exceed compression of the finger in the axial direction.

When pressure is applied on the fingers, a displacement of the crest portion of the undulation of the base layer in a direction substantially perpendicular to the axial direction of the fingers may exceed a displacement of the distal end of the finger in a direction substantially perpendicular to the axial direction.

A material forming at least a part of support structure may be silicone.

In one aspect of the disclosure, a support arrangement is provided. The support arrangement comprises a core layer, a first support structure being arranged on the substrate, and a cover is arranged above the support structure.

The first support structure may be or comprise the support structure according to any of the aspects above.

The support arrangement may be, form part of or intend to form part of, a mattress, a pillow, a seat, and/or a cushioning, such as a seat cushioning.

A second support structure may be arranged above the first support layer. The second support structure may extend partially over the first support layer. The second support structure may partially cover the second support layer. The extension of the second support structure may be adapted to the shape of the body, or part of body.

The second support structure may be formed of a polymeric material, such as a thermoplastic material. The polymeric material may be an elastomer, for example a thermoplastic elastomer. The polymeric material may be formed of silicone rubber.

The second support structure may have a different design than the first support structure.

In one example, the second support structure is free from fingers of type provided on the first support structure. The second support structure may comprise protuberances.

In one example, the second support structure may comprise a plurality of protuberances facing the fingers of the first surface structure. The protuberances may extend from a base layer of the second support structure. The protuberances of the second support structure may be different from the fingers of the first support structure in term of shape, extension, material, etc. The second support structure may be positioned at position intended to support at part of a body resulting in larger pressure, such as heels and head.

The second support structure may be attached to a surface of the cover intended to face the first support structure.

The core layer may be a foamed substrate, such as a cold foamed substrate. The foamed material may be polyurethane. In other examples, the core may comprise a mattress base layer.

The cover may enclose the support structure and the core layer. The cover may be water resistant. The cover may be permeable. The cover may be bacteriostatic and/or fungistatic. The cover may be a sheet. The cover may be textile layer. The cover may form a protective layer.

An intermediate layer may be arranged between the core and the first support structure. The intermediate layer be made of a thermoplastic material, an elastomer and/or rubber. The intermediate layer may reduce heat conduction between the support structure and the core. The intermediate layer may prevent fluids from entering into the core layer.

The cover may be provided with sensors. The sensors may be arranged in a surface of the cover intended to face the first support structure. The sensors may be attached to the cover, or may be arranged between the cover and the first support structure. The sensors may be of the type described below.

The support structure described above with references to the aspects of the disclosure can be provided with a variety of sensors. The sensors may be thermal sensors, light sources such as diodes, ultrasound or doppler sources; pressure sensors; vibration sensors, humidity or moisture sensors, sensors providing data on electrical properties such as tissue impedance, conductivity, resistance; mechanical stress, strain, displacement sensors, MEMs, micro sensors, or sensors comprised of nano-materials. The sensors can be arranged in the base layer and/or in fingers and/or raised portions. The sensor can detect data from the body or part of body, or from the support structure itself. Sensors may provide data on the function of the support structure, indicating mechanical properties such as deflection, displacement, relative positions, duty and cleaning cycles, cleaning and service intervals, wear, remaining service life, etc. Sensors may be included to monitor or provide data on conditions of the body or part of body, such as microcirculation in the tissues supported by the support structure, moisture, shear, fluid accumulations, temperature, air flow, circulation, and patient positioning. Data from sensors may provide information relating to the condition of the body or part of body. Sensors may be arranged at multiple locations. Sensors, software, and digital hardware-based UI/UX may be integrated in matrass system, such as in the first surface or second surface of the base layer, in the fingers, in matrass cover and/or in a separate digital device providing data readout, alarms, reminders, patient and/or support system information.

All aspects of the disclosure described above may be combined. All examples described in relation to the aspects above may be combined with any other aspect.

The reference to a body or a part of a body above is understood to include a human body and an animal body.

The aspects described above may also be intended to support any type of physical object, in additional to a human body, animal body, or part of human body or animal body. The disclosure above when referring load from body, or part of body, is applicable also for load from any type of object.

The support structure according to any of the aspects disclosed above may be included in, among other, positioning systems, furniture, transport applications, industrial applications, safety equipment, clothing, footwear.

In any of the above aspects, a sub-layer, for example a foamed sub-layer, a gel sub-layer, an air sub-layer, a fluid sub-layer, may be provided on or attached to the second surface of the base layer and thereby may be included in the support structure. Such a sub-layer may form a synergistic part of the loading, support, and/or pressure distribution system.

In all aspects, when used on a dry surface, such as included in, forming, or forming part of, a mattress, pillow, cushion, a sub-layer is arranged on the second surface of the base layer. In such examples, the support structure may comprise the sub-layer arranged on the second surface of the base layer. In such examples, the support structure is intended to be positioned on a surface of an object. The sub-layer may be a foamed layer such as a foamed mattress.

The thickness and/or density of the foamed layer such as foamed mattress may differ depending on the intended use and be adapted to the intended use.

In all aspects, when used in humid or wet environment, the second surface of the base layer may be intended to directly face an object, for example when placed in a shower. When used as a dressing, the second surface of the base layer may be intended to face away for the skin. In such examples, no sub-layer or backing layer may be intended to be attached to the second surface of the base layer. In such examples, the thickness and/or density of the base layer may vary depending on the intended use of the support structure. The base layer of a support structure intended to be used as a dressing may be thicker than a base layer of a support structure intended to be used together with a sub-layer, such as a foamed mattress.

In any of the above aspects, a backing layer may be provided on or attached to the second surface of the base layer. The backing layer may be soft, deformable and/or resilient. The backing layer may be attached or may be integral to the base layer. The backing layer may be co-moulded with the base layer, for example a foamed co-moulded layer. Products including a backing may, for example, be a shower stool or arm rest, a formed dressing or guard such as a heel guard. The backing layer may have load and/or shock distribution or absorption features.

In any of the above aspects, the second surface of the base layer may be provided with anti-slip protuberances. The protuberances are configured to increase friction with an underlying surface such as mattress, pillow, or cushion.

In any of the above aspects, the support structure may be included in a frame, or may be included in a cover.

The support structure according to any of the aspects described above may be used in, forming part of, and/or be included in:

- mattresses and covers thereof
- pillow, cushions, and covers thereof
- dressing
- furniture and components thereof, for example as cushioning on a furniture part, such as a seat,
- wheelchair, for example as cushioning on a wheelchair part
- vehicles such as cars, trucks, construction and/or farming vehicles, airplanes, etc., and components thereof, such as seats, for example as cushioning in a seat, and/or in a seating cover,
- positioning systems
- lifting devices
- transportation device
- safety equipment
- clothing, for example as a cushioning
- footwear, for example as a cushioning
- assistive devices, such as canes, crutches, walkers, wheelchairs, and shower chairs, for example as a cushioning
- medical devices.

Common for at least examples of all aspects of the disclosure is that shear may be at least reduced on the skin, body part or body. Shear may at least be reduced by the fingers following the skin or body part movement, for example by deflecting or deforming of the fingers and/or the deformable portions. Movements by the fingers on the surface of the skin or body part may at least be reduced. The support structure according to at least examples of the aspect above at least partly absorbs the shear forces that otherwise would have been absorbed by the skin or body part.

BRIEF DESCRIPTION OF THE DRAWINGS

The present disclosure will by way of example be described in more detail with reference to the appended schematic drawings, which show embodiments of the present disclosure.

FIGS. 1*a-d* shows an example of a support structure, wherein FIG. 1*a* shows a portion of a support structure, FIG. 1*b* shows a cross-section of the support structure along line A-A in FIG. 1*a*, FIG. 1*c* shows the support structure, and FIG. 1*d* shows air flow through the support structure of FIGS. 1*a-c*.

FIGS. 3*a-d* shows an example of a support structure, wherein FIG. 3*a* shows a perspective view, FIG. 3*b* shows a top view, FIG. 3*c* shows a side view, and FIG. 3*d* shows a perspective view from below.

FIGS. 4*a-g* shows examples of a support structure with fingers extending from a raised portion, wherein FIG. 4*a* shows an example of a support structure, FIG. 4*b* shows a cross-section along line A-A in FIG. 4*a*, FIG. 4*c* shows an example of a support structure, FIG. 4*d* shows a cross-section along line A-A in FIG. 4*c*, FIG. 4*e* shows an example of a support structure, FIG. 4*f* shows a cross-section along line A-A in FIG. 4*e*, and FIG. 4*g* shows a cross-section along line B-B in FIG. 4*e*.

FIGS. 8*a-c* shows an example of a support structure, wherein FIGS. 8*a* and 8*b* show examples of the support structure, and FIG. 8*c* shows a cross-section along line A-A in FIGS. 8*a* and 8*b*.

FIGS. 9*a-c* shows an example of a support structure having at least a first portion and at least a second portion, wherein FIGS. 9*a* and 9*b* show examples of the support structure, and FIG. 9*c* shows a cross-section along line A-A in FIGS. 9*a* and 9*b*.

FIGS. 19*a-c* shows a cross-section of the support structure in FIG. 18, wherein FIG. 19*a* shows the support structure in an unloaded state, and FIGS. 19*b-c* shows the support structure when pressure is applied.

DETAILED DESCRIPTION

Figure 1A:
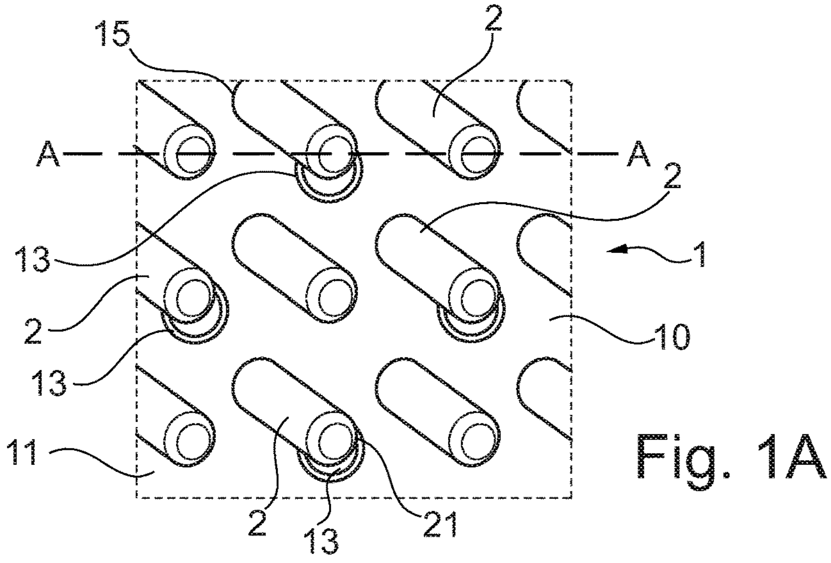
Figure 1B:
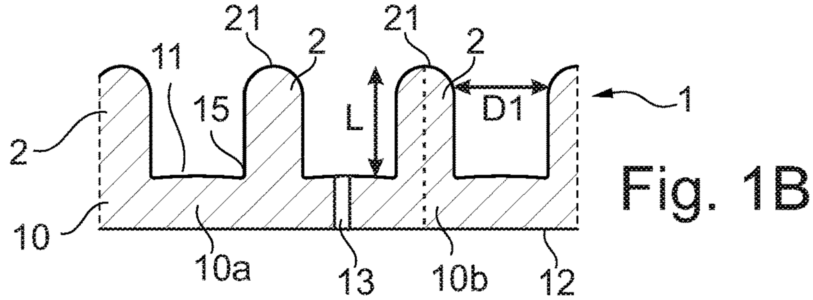

A support structure 1 will be described with reference to the appended drawings. The support structure 1 is adapted to support and/or contact a body or part of body. The body may be a human body or an animal body. The support structure 1 may also be intended to support any type of object.

The support structure 1 may be intended to contact skin and other tissues. Contact may be direct, or indirectly with an intervening layer, such as foil, film, sheet, etc., positioned between the support structure 1 and the tissue.

The support structure 1 may have various shapes. The shape and size of the support structure 1 is adapted to the intended use of the support structure 1, such as being adapted to the size of the part of the body to be supported or be in contact with. The support structure 1 may be included in a structural element, or may form of a structural element. The support structure 1 may form an integral part of the structural element, or may be positioned and/or attached to the structural element. As an example, the support structure 1 may be arranged on a seat of a wheelchair, or may be an integral part of the seat of the wheelchair.

The support structure 1 may be used in conjunction with, form part of, or be included in, among other medical devices, assistive device, vehicles, furniture, seats, clothing and footwear, safety equipment, transportation devices, lifting devices, positioning devices, bed systems, and bedding. Examples of assistive devices may be canes, crutches, walkers, wheelchairs, and shower chairs. Example of medical devices may be dressings or plasters. Examples of bed systems and beddings may be mattresses, mattress covers, pillow, pillow covers, cushions, pillow cushions. Examples of use in vehicles may be in seats, seat structure, seat supports, and/or seat coverings. The support structure 1 may be used as a cushioning of the above listed devices, or part of devices.

The support structure 1, or parts of the support structure 1, may be formed of a polymeric material, such as a thermoplastic material. The polymeric material may be an elastomer, for example a thermoplastic elastomer. The polymeric material may be formed of silicone rubber. The polymeric material may be foamed. In other examples, the support structure 1, or parts of the support structure 1, may be formed from pulp and fibre materials, and/or plant-based materials. The support structure 1, or parts of the support structure 1 may be formed of metal. Combinations of materials are also considered, such as different material for different parts of the support structure 1, or a layered structure, for examples as coatings applied on a base material, for example a metal layer assembled or deposited or electroformed to improve dissipation of heat.

The support structure 1 may be moulded in one part, such as being injection moulded. The support structure 1 may be formed as part attached to each other.

Material properties may vary depending on the intended use. One example of a material property chosen depending to the intended use is hardness. If the support structure 1 is intended to form, or part of, a mattress, a harder material is chosen compared when the intended use of the support structure 1 is in a dressing.

The support structure 1 is based on a principle of at least reducing one or more of the following: shear on tissue and/or skin supported or contacted by the support structure 1, pressure on tissue and/or skin supported or contacted by the support structure 1, contact surface between the tissue and/or skin supported or contacted by the support structure 1 and parts of the support structure 1.

FIGS. 1*a-d* disclose an example of a portion of the support structure 1. The support structure 1 comprises a base layer 10 and a plurality of fingers 2. The base layer 10 comprises a first surface 11 and a second surface 12. The first surface 11 and the second surface 12 may be substantially co-planar. The first surface 11 is configured to face the body, or part of body, object or similar. The fingers 2 extends from the first surface 11 away in an axial direction away from the first surface 11. The fingers 2 may extend substantially perpendicular from the first surface 11.

A portion of the base layer 10 positioned below and/or surrounding the fingers 2 forms a deformable portion 10*b* of the base layer 10. Portions of the base layer 2 positioned adjacent the deformable portion 10*b* forms a base portion 10*a* of the base layer 10. The base portion 10*a* may extend between adjacent deformable portions 10*b*.

An upper surface of the base portion 10*a* may be substantially co-planar with a lower surface of the base portion 10*a*.

An upper surface of the deformable portion 10*b* may be substantially co-planar with a lower surface of the deformable portion 10*b*.

The base layer 2 may in one example be provided with at least one opening 13. The opening 13 may extend between the first surface 11 and the second surface 12. Air and fluids may pass through the opening 13.

In the example shown in the drawings, the base layer 10 is formed of a single layer. In other examples, the base layer 10 may be formed of more than one layer.

The fingers 2 may have a substantially circular cross-section. Other shapes are also considered, such as any polygon. The fingers 2 may have a conical shape. The fingers 2 may be solid. In another example, the fingers 2 may be hollow or tubular.

The fingers 2 may be arranged with an equal distance between adjacent fingers 2. As an alternative, the fingers 2 may be arranged with different distances between each other. The fingers 2 may be positioned in a random pattern. Two or more fingers 2 may be arranged in a group with an equal distance between fingers 2 in the same group, but with a different distance to fingers 2 belonging to a different group. The distance to fingers 2 forming a different group, such as a second group, may be exceeding the distance between fingers belonging to the same group. Such groups of fingers 2 will be described with reference to FIGS. 3*a-d* and 4*a-g*.

The fingers 2 have distal end 21 configured to support or contact the body, party of body, or object. The distal end 21 is arranged at a distance from the first surface 11. The distal end 21 of the fingers 2 may have a half-spherical shape, as seen in the cross-section in FIG. 1*b*. The distal end 21 of the fingers 2 may be convex, as seen in the cross-section in FIG. 1*b*. In one example, as shown in the cross-section in FIG. 1*d*, the distal end 21 has a plane top surface.

The distal ends 21 may be configured to directly support the body, part of body or object, or an intervening layer such as a sheet may be positioned between the support structure 1 and the user of the support structure 1. The intervening layer may be a protective layer 150 as shown in FIG. 19.

At least the distal ends 21 of the fingers 2 may be adhesive. At least a portion of the fingers 2 may be adhesive.

In one example, the protective layer 150 forms an intervening layer configured to be position between the body or part of body and the fingers 2. The protective layer 150 may be porous. The protective layer 150 may be adhesive. A surface of the protective layer 150 configured to face the skin, body part or body may be adhesive. A surface of the protective layer 150 configured to face the fingers 2 may be adhesive.

The fingers 2 and/or the base layer 10 may be formed of a polymeric material. The fingers 2 and/or the base layer 10 may be formed of a thermoplastic material. The fingers 2 and/or the base layer 10 may be formed of an elastomer, for example a thermoplastic elastomer. The fingers 2 and/or the base layer 10 may be formed of silicone rubber. The polymeric material may be foamed.

In one example, the fingers 2 and/or the base layer 10 may be formed from pulp and fibre materials, and/or plant-based materials. Deflection members in the base layer 10 may be provided by slots or perforations which enable elastic deflection.

Combinations of materials are also considered. For example, fingers 2, deformable portions 10*b* of the base layer 10, the base layer 10 and base portion 10*a* may be of different materials. A layered structure is also considered, as coatings applied on a base material, for example a metal layer assembled or deposited or electroformed to improve dissipation of heat.

The material forming the fingers 2 may have a Shore value measured in the 000 scale. In one example, the material forming the fingers 2 may have a Shore value measured in the 00 scale. In one example, the material forming the fingers 2 may have a Shore value measured in the 0 scale. In one example, the material forming the fingers 2 may have a Shore value measured in the A scale. In one example, the material forming the fingers 2 may have a Shore value measured in the D scale.

In one example, the material forming the fingers 2 may have a Shore value exceeding 25-000 (000 Shore scale). In one example, the material forming the fingers 2 may have a Shore value in the range of 25-000 to 80-00. In one example, the material forming the fingers 2 may have a Shore value exceeding 30-D (D Shore scale). In one example, the material forming the fingers 2 may have a Shore value in the range of 30-D to 100-D. In one example, the material forming the fingers 2 may have a Shore value in the range of 10-A to 50-A.

The fingers 2 are more rigid than the deformable portion 10*b* of the base layer 10. The fingers 2 are stiffer than the deformable portion 10*b* of the base layer 10.

By being more rigid is understood to mean that if a certain defined force is applied to the finger 2 and to the deformable portion 10*b* of the base layer 10, respectively, a displacement of the deformable portion 10*b* of the base layer 10 exceeds a displacement of the finger 2 in a direction substantially parallel to the axial direction of the finger 2.

Thereby, a Shore value of the material forming the deformable portion 10*b* is less than the Shore value of the material forming fingers.

In one example, fingers 2 are reinforced while the deformable portion 10*b* is not reinforced.

A thickness of the base layer 10 may depend on the intended use of the support structure. The thickness may be defined as the distance between the first surface 11 and the second surface 12, in a direction perpendicular to the axial direction of the fingers 2. In one example, when the support structure is intended to form or be included in a mattress, the thickness of the base layer 10 may be between 1-20 mm such as less than 10 mm, for example 1-3 mm. In one example, when the support structure is intended to form or be included in a dressing, the thickness of the base layer 10 may be between 0.01-1 mm such as less than 0.05 mm. Similarly, when the support structure is intended to be attached or positioned on a sub-layer, the thickness of the base layer 10 may be between 0.01-1 mm such as less than 0.05 mm.

A thickness of the deformable portion 10*b* and/or the base portion 10*a* may be measured similarly to the thickness of the base layer 10.

A thickness of the deformable portion 10*b* may correspond to the thickness of the base layer 2, and/or to the thickness of the base portion 10*a*. In such an example, the base layer 2 has a uniform thickness. In other examples, the deformable portions 10*b* may have a thickness being less than the thickness of the base layer 10, and/or less than a thickness of the base portion 10*a*.

As seen in FIGS. 1*a-d*, the fingers 2 are arranged at a distance D1 from each other. The distance D1 is measured as the shortest distance between a surface of a first finger to a surface to a second finger, adjacent the first finger, in a direction transverse to the axial direction. The distance D1 may depend on the intended use of the support structure 1. In one example of on unloaded or unsupported state, i.e., when no pressure applied on the support structure, for example as shown in FIGS. 1*a-d*, a distance D1 between adjacent fingers may be 5-30 mm such as 5-15 mm. In another example, when no pressure is applied on the support structure, a distance D1 between adjacent finger may be 0.5-10 mm such as 2-5 mm, for example when used as or included in a dressing.

The fingers 2 have a length L. In the example shown in FIGS. 1*a-d*, the length L is measured from the first surface 11 to the distal end 21 of the finger 2 in the axial direction. All fingers 2 may have a similar length, or the length may differ between fingers 2 on the support structure 1. The length L may differ on the intended use of the support structure 1. In one example, a length L of the fingers 2 may be 5-40 mm such as 5-20 mm, for example when used in a relatively large support structure 1 such as a matrass. In another example, a length L of the fingers 2 may be 1-10 mm such as 1-5 mm, for example when used as or included in a dressing.

The length L of the fingers 2 may be configured to correspond to the desired total thickness of the support structure 1, i.e., length L of fingers 2, thickness of the base layer 2 and optional sub-layer, such that a finger 2 on a matrass construction may be optimally long while in an application requiring thinness, a relatively shorter finger may be adequately functional.

A ratio between the distance D1 between adjacent fingers in the unloaded or unsupported state to the length L of a finger may be at least 1:2. In one example, the ratio may be in the range of 1:2 to 1:10. In one example, the ratio may be less than 1:20.

A ratio between a thickness of the deformable portion 10*b* of the base layer 2 to a length L of the finger 2 may be at least 1:2 such as at least 1:3, such that in the range of 1:2 to 1:10. In one example, a ratio between a thickness of the deformable portion 10*b* of the base layer 10 to a length L of the finger 2 may be at least 1:2 such as in the range 1:2 to 1:10, for example for a material having a Shore value in the A scale. In one example, a ratio between a thickness of the deformable portion 10*b* of the base layer 10 to a length L of the finger 2 may be at least 1:1 such as in the range 1:2 to 1:8, for example for a material having a Shore value in the 00 or 000 scale. In one example, a ratio between a thickness of the deformable portion 10*b* of the base layer 10 to a length L of the finger may be at least 2:1, such that in the range of 2:1 to 10:1.

In an example wherein the base layer 10 is relatively thick, such as having a thickness exceeding 20 mm, for example a mattress, the ratio may be 1:1. In an example wherein the base layer 10 is relatively thin, such as being a thin film having a thickness of 0.05 mm, a ratio may be 1:100. In one example, the ratio between a thickness of the deformable portion 10*b* of the base layer 2 to a length L of the finger 2 may be in the range of 15:100.

The distal end 21 of the fingers 2 may have a surface area of at least 3 $mm^2$. In one example, a surface of the distal end 21 of the fingers 2 may have a surface area of at least 5 $mm^2$, for example between 10-20 $mm^2$.

If the fingers 2 have a substantially circular cross-section, a diameter of the finger 2 at the distal end 21 may be 2.5-15 mm such as 4-5 mm. In another example, for example when used as or included in a dressing, the diameter of the fingers 2 at the distal end 21 may be 1-5 mm such as 2-3 mm.

If the fingers 2 have a cross-section at the distal end 21 having a different shape than circular, the fingers 2 may have an extension of 2.5-15 mm perpendicular to the axial direction at the distal end 21. In another example, for example when used as or included in a dressing, in a cross-sectional extension of the fingers 2 perpendicular to the axial direction, the finger 2 may have an extension of 0.1-10 mm such as 0.1-2.5 mm at the distal end.

The fingers 2 may taper towards the distal end 21 such that a diameter at the base of the finger 2 is exceeding the diameter at the distal end 21. The taper angle may be 0-7°. The resulting base area affects the available area of deformable portion 10*b*. A greater taper angle and resulting greater finger base area results in less interstitial area of the raised portion. This will result in a thinner deformable portion 10*b* to allow for the same amount of relative flexure between fingers 2.

A ratio between the diameter of the distal end 21 of the fingers 2, or effective diameter in the case of a non-circular finger 2, to the distance D1 between adjacent fingers 2 may be at least 1:1 such as at least 1:2 such as 1:3. Said ratio may be less than 1:5 in a support surface requiring less acute bending of fingers 2. Increasing the distance D1 between adjacent fingers in view of the diameter of the fingers improves air flow through the support surface. The distance D1 between adjacent fingers may be measured when no pressure is applied.

In a thin support structure, such as being intended to form or form part of a ratio, a ratio of 2:1 between diameter of distal end 21 of the fingers 2 to the distance D between adjacent fingers 2, for example as a diameter of 6 mm and a finger distance of 3 mm. The distance D1 between adjacent fingers may be measured when no pressure is applied.

Figure 1C:
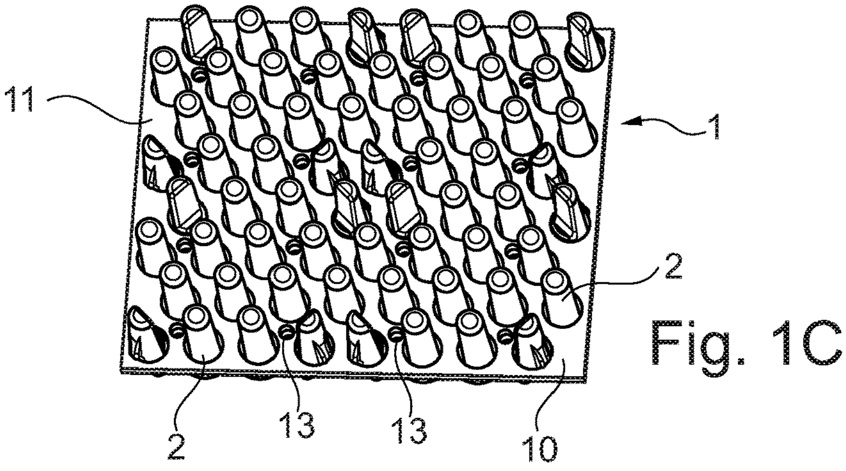

FIG. 1*c* shows a perspective view of the support structure 1. The support structure 1 may have a rectangular shape. The shape and size of the support structure 1 may depend on the intended use of the support structure 1.

A total area of the surface areas of the distal ends 21 of the fingers 2 may be less than 50% of an area of the support structure 1. The area of the support structure 1 is defined by the area formed by the outer boundaries of the support structure 1, as visible in FIG. 1*c*. The total area of the surface areas of the distal ends 21 of the fingers 2 may be exceeding 10% of an area of the support structure 1, such as in the range of 10-50%, for example 20-30%.

Figure 1D:
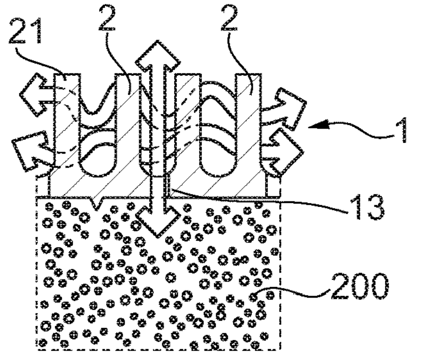

FIG. 1*d* shows air circulation in the support structure 1 in more details. In the example shown in FIG. 1*d*, the support structure 1 is attached to or positioned on a sub-layer 200. The sub-layer 200 may, for example, be a foamed layer as in the example in FIG. 1*d*. In one example, the support structure 1 comprises the sub-layer 200, the sub-layer 200 being positioned on the second surface 12 of the base layer 10.

FIG. 1*d* shows air circulating between the fingers 2. The distance D1 between the fingers 2 forms a passage for air to circulate to improve air circulation of the support structure 1.

In addition to the air passage between the fingers 2, air may circulate through the base layer 10 in the openings 13. Thereby, air is allowed to circulate in a direction parallel to the base layer 10, and in an axial direction, through the base layer 10.

The support structure 1 will now be described in a state wherein pressure is applied on the support structure with reference to FIGS. 2*a-d.*

The support structure 1 may be of the type disclosed above with reference to FIGS. 1*a-d*. The description above with reference to FIGS. 1*a-d* is applicable also for the support structure 1 described throughout the description.

Pressure may be applied by a load applied by a body, part of body, or object, on the distal ends 21 of the fingers 2. One such example is a person sitting on a chair provided with the support structure 1. Another example is a person laying on the support structure 1, or laying on a mattress provided with the support structure 1.

Pressure may also be applied on the support structure 1, such as a force applied on the second surface 12 of the base layer 10. In an example wherein the support structure 1 forms or forms part of a dressing, the pressure may be applied on the second surface 12 of the base layer 10, either directly or by an underlying layer, such that the fingers 2 acts on the body, or part of body, with a force. In the example with a dressing, a force may also be applied by the body or part of body, if the dressing is position on the body such as that the weight of the body or part of body is applied on the support structure 1.

Figure 2A:
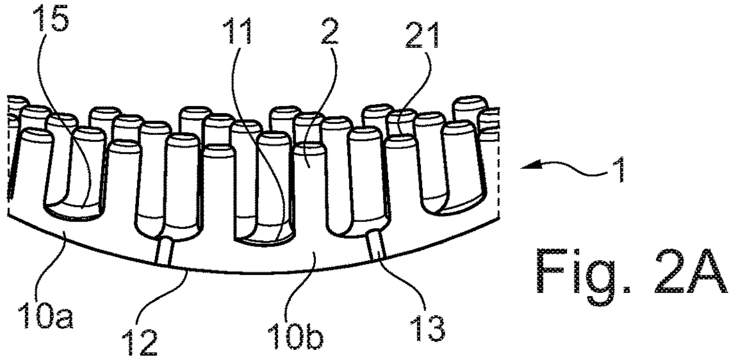
FIGS. 2*a-d* shows the support structure in FIGS. 1-*d* when pressure is applied.
Figure 2B:
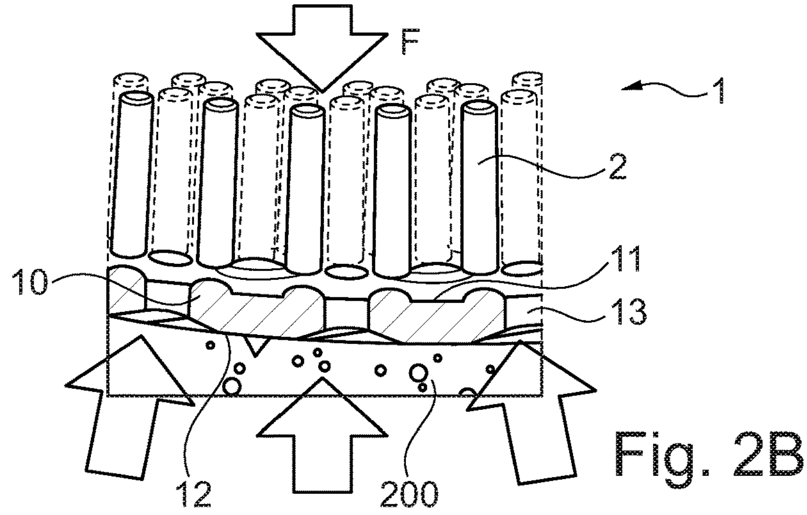
Figure 2C:
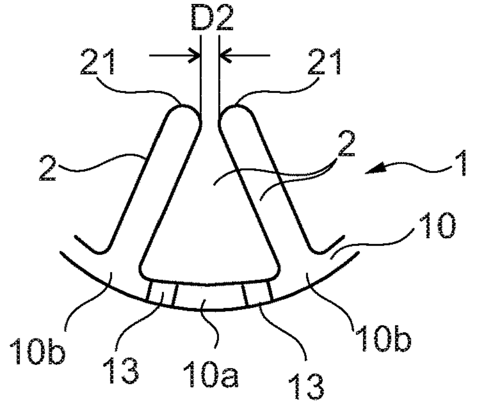

FIG. 2*a* shows a part of the support structure under pressure applied on the distal ends 21 of the fingers 2. As shown in FIGS. 2*a-c*, the base layer 10 may be curved when pressure is applied, for example by force F applied, as shown in FIG. 2*b*. The base layer 10 may be configured to follow the body, or part of body, object, when pressure is applied. Under pressure applied, the first surface 11 of the base layer 10 and the second surface 12 of the base layer 10 may be co-planar. The deformable portion 10*b* of the base layer 10 may have a substantially planar extension. When pressure is applied, the deformable portion 10*b* may have a concavely curved shape as seen from the first surface 11 of the base layer 10.

In FIG. 2*b*, the support structure 1 is positioned on or attached to a sub-layer 200, for example a foamed sub-layer. The openings 13 in the base layer 10 extends between the first surface 11 of the base layer 10 to the sub-layer 200.

When pressure is applied the base layer 10 deforms more than the fingers. Especially, the deformable portion 10*b* deforms more than the finger 2 extending from the deformable portion 10*b*.

The fingers 2 may be more rigid than the deformable portion 10*b*, such as deformation of the deformable portion exceeds deformation, bending and/or compression of the finger 2. The deformable portion 10*b* of the base layer 10 may flex, or may deflect, more than the finger 2. The deformable portion 10*b* may be elastically deformed when pressure is applied.

Figure 19A:
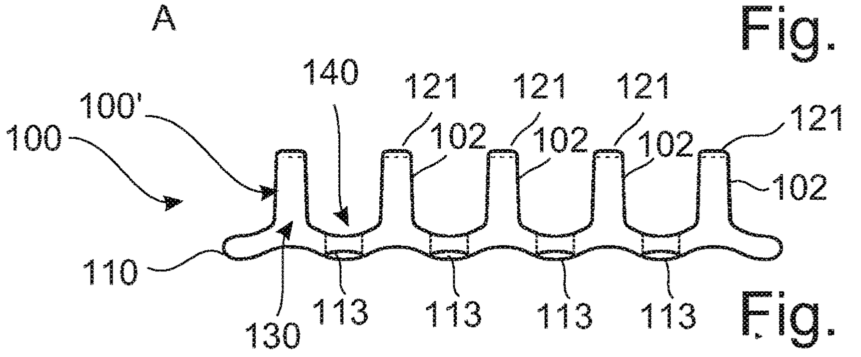
Figure 19B:
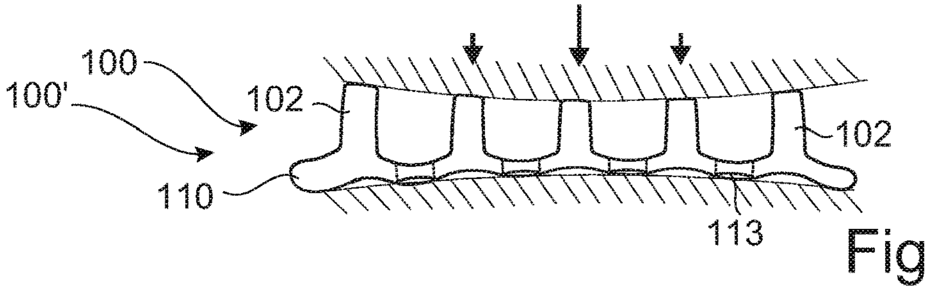
Figure 19C:
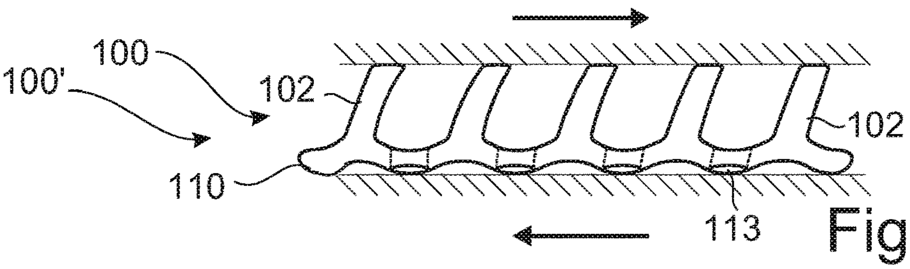

The fingers 2 may also deflect in a direction perpendicular to the axial direction fingers 2 when pressure is applied to the fingers, which principle is shown in FIG. 19*c*. Shear may be reduced by the fingers 2 following the skin or body part movement, for example by deflecting or deforming. Under pressure, the fingers 2 may remain substantially parallel as shown in FIG. 19*c*.

The base layer 10 may comprise intermediary portions 15 from which the fingers 2 extend. The deformable portions 10*b* may be more flexible than the intermediary portions 15. The intermediary portion may be in form of a radius extending between the first surface 11 of the base layer 10 and the finger 2. The intermediary portion 15 may restrict bending of the finger 2, such that adjacent fingers 2 do not contact each other when pressure being applied.

The intermediate portions 15 may be in form of a projection, as will be described below with reference to FIGS. 8*a-c*.

As seen in FIGS. 2*a-d*, the fingers 2 may have a substantially linear extension in the axial direction when pressure is applied. Under pressure applied, the fingers 2 are not bent or curved by the pressure. Under pressure applied, the fingers 2 may be substantially linear displaced in the axial direction. The displacement in the linear direction may exceed the displacement in a radial direction, transverse to the axial direction. The linear direction may correspond to the axial direction.

Under pressure applied, deformation of the deformable portion 10*b* may exceed deformation of the finger 2. Deformation of the deformable portion 10*b* in the axial direction may exceed deformation of the finger 2 in the axial direction.

Deformation of the finger 2 in the axial direction may in one example be compression of the finger 2 in the axial direction, such that deformation of the deformable portion 10*b* in the axial direction exceeds compression of the finger 2 in the axial direction.

Deformation may be a deflection, such as deflection of the deformable portion 10*b* may exceed deflection of the finger 2.

Under pressure applied, the deformable portion 10*b* may be displaced in a direction parallel to the axial direction, and/or be displaced perpendicular to the axial direction.

Under pressure applied, displacement of the deformable portion 10*b* in a direction perpendicular to the axial direction, which may be a radial direction, may exceed a displacement of a distal end of the finger in a direction perpendicular to the axial direction, such that a distance D2 between adjacent fingers is provided, for example in form of a gap between distal ends 21 of adjacent fingers 2.

FIG. 2*c* discloses in more details that adjacent fingers 2 are arranged at a distance D2 from each other even when pressure is applied, such that a gap is maintained between adjacent fingers 2. The distance D2 is measured as the shortest distance between a surface of a first finger to a surface to a second finger, adjacent the first finger, in a direction transverse to the axial direction. In one example, the shortest distance D2 between adjacent fingers may be a distance between distal ends 21 of adjacent fingers 2, or between a distal end 21 of a first finger and any other surface of a second finger, adjacent the first finger.

By maintaining a distance D2 between adjacent fingers 2 such that a gap is formed, the fingers 2 do not contact each other when pressure is applied. As shown in FIG. 2*c*, the deformable portion 10*b* is displaced, and in FIG. 2*c*, curved. To at least reduce bending of the fingers 2, the deformable portion is displaced instead of bending or displacing the fingers 2. The displacement of the deformable portion 10*b* in the radial direction exceeds the displacement of the distal end 21 of the finger 2 in the radial direction. Thereby, a gap can be maintained between distal ends 21 of adjacent fingers 2 when pressure is applied. When pressure is applied, adjacent fingers 2 may still be separated by the distance D2.

By choosing correct ratio of finger length, finger diameter, distance between adjacent fingers 2, thickness of the base layer etc., adjacent fingers 2, and/or distal ends 21 of adjacent fingers 2, may be separated by a distance D2 even when pressure is applied. Such ratios are described above with references to FIGS. 1*a-d*.

In one example, the distance D2 between adjacent fingers 2 when pressure is applied may substantially correspond to the distance D1 between adjacent fingers 2 when no pressure is applied. One such example is when no deflection, or substantially no deflection, of the fingers 2 occurs when pressures is applied.

In one example, the distance D2 between adjacent fingers 2 when pressure is applied may be less than the distance D1 between adjacent fingers 2 when no pressure is applied.

In one example, when pressure from a body or body part is applied on the support structure, the distance D2 between adjacent fingers 2 may be 0.5-30 mm, such as 1-15 mm. In another example, when pressure from a body or body part is applied on the support structure, a distance D2 adjacent fingers 2 may be 0.1-10 mm, such as 0.5-5 mm for example when used as or included in a dressing.

Figure 2D:
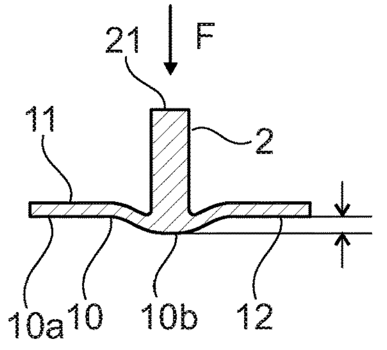

FIG. 2*d* shows in more details the displacement of the deformable portion 10*b* in the axial direction. The deformable portion 10*b* has been displaced downwards below the finger 2 by the pressure applied by force F on the distal end 21 of the finger 2. In one example, the displacement of the deformable portion 10*b* in the axial direction exceeds the compression of the finger 2 in the axial direction. This may be achieved by the finger 2 being more rigid than the deformable portion 10*b*.

As mentioned above, deformation of the deformable portion 10*b* in view of the fingers 2 obtained by the finger 2 being more rigid than the deformable portion 10*b*. Controlling the deformation of the deformable portion 10*b* in view of the fingers 2 may be obtained by different material properties, adding reinforcement, and/or by the design of the deformable portion 10*b* in view of the finger 2. By having solid fingers 2 and a comparable thin deformable portion 10*b*, the same material may be used for both portions. As alterative or complement, materials with different Shore values may be chosen. Further, deflections in the base layer 10 may be provided by slots or perforations in the deformable portion 10*b* which enable elastic deflection, which is described in more details with reference to FIG. 6.

By transferring forces from the fingers 2 to the deformable portion 10*b*, it has been shown that shear on the skin can be at least reduced. Shear may occur by friction acting on the skin. When a person is sitting or lying on a surface, tissue under the skin may be brought into movement by gravity, but the skin itself is not moving due to friction acting on the skin from the underlying structure onto which the person is sitting or lying. This may cause damages on the skin, resulting in wounds which may be difficult to heal. By the reduced bending of the fingers 2 and/or facilitating deflection of the fingers 2, shear forces on skin supported by the distal ends 21 of the fingers 2 can be reduced. As an example, the skin may move together with the underlying tissue when being supported by the bendable fingers 2. Thereby, pressure ulcers, decubitus, bed sores, can be prevented or at least reduced. Further, the reduced bending of the fingers 2 may result in a consistent pressure on the body, or part of body, being supported. The distribution of fingers 2, a total area of the surface area of the distal ends 21 of the fingers 2 in view of the total area of the support structure 1, may result in reduced contact surface with the tissue being in contact with the support structure 1. Further, improved blood circulation may be obtained with the support structure 1. The displacement of the deformable portions 10*b* may result in an improved positioning of the support structure 1 and may at least reduce the risk of unintentional displacement of the support structure 1.

FIG. 3*a-d* shows an example of the support structure 1 wherein the base layer 10 comprises raised portions 30. The support structure 1 corresponds to the support structure 1 in FIGS. 1*a-d* and in FIGS. 2*a-d*, such that the description relating to the support structure in FIGS. 1*a-d* and FIGS. 2*a-d* is applicable also for the support structure in FIGS. 3*a-d*.

In the example in FIGS. 3*a-d*, the raised portions 30 forms the deformable portion 10*b* previously described. The fingers 2 extends from the raised portions 30. At least one finger 2 may extend from the raised portions 30. The number of fingers 2 extending from each raised portion 30 may be 1-12. The number of fingers 2 extending from each raised portion 30 may depend on the shape and size of the raised portion 30. The fingers 2 may be of the type previously described.

In the base layer 10, the raised portions 30, forming the deformable portions 10*b*, extend between the base portion 10*a* of the base layer 10. When pressure is applied to or on the support structure 1, the raised portions 30 have a function and behaviour corresponding to the function and behaviour of the deformable portions 10*b*.

The raised portions 30, or at least a part of the raised portions 30, may be formed to increase and/or facilitate deflection of the raised portion 30 when pressure is applied. Another part of the raised portion 30 may be formed to stabilise the finger 2 such that bending of the finger 2 is reduced or prevented.

In the example shown in FIGS. 3*a-d*, the raised portions 30 have a triangular shape. The raised portion 30 comprises three fingers 2. The fingers 2 are positioned adjacent a corner of the triangular shape. Other shapes of the raised portions 30 may be provided, for example polygon shape, such as triangular, quadrilateral such as square or rectangular, pentagon, for example pentagram, hexagon, octagon. The raised portion may have a circular, oval, crescent, asterisk, toroid or obround shape. As an alternative to position fingers 2 at corners of the raised portion 30, fingers 2 may be positioned at a different position than at a corner, for example positioned between two adjacent corners of the raised portion 30.

The shape of the raised portions 30, and/or the positioning of a raised portion 30 vis-à-vis another raised portion 30 may be designed to improve and/or control the air flow between the fingers 2 and the raised portions 30, for example in a direction parallel to the extension of the base layer 10.

The raised portion 30 has an upper surface and a lower surface. The upper surface and the lower surface may be substantially coplanar. A thickness of the raised portion 30 may be between 1-20 mm such as less than 10 mm. In one example, when the support structure is intended to form or be included in a dressing, the thickness of the raised portion 30 may be between 0.01-1 mm such as less than 0.05 mm. Similarly, when the support structure is intended to be attached or positioned on a sub-layer, the thickness of the raised portion 30 may be between 0.01-1 mm such as less than 0.05 mm.

A height of the raised portion 30, as measured in the axial direction from the base portion 10*a* to the top of the raised portion 30, may be 1-50 mm such as 1-20 mm. In one example, height may be less than 10 mm, for example 1-5 mm. In another example, the height may be 0.05-3 mm.

In one example, the base layer 10 has a thickens of about 1.6 mm and the height of the raised portion 30 may be about 3.5 mm.

A ratio between the thickness of the base layer 10 and the height of raised portion 30 may be in the range of 1:1 to 1:4. In the upper limit of the range, the portion 30 may have a function of a distancing arm, which will be described with reference to FIGS. 8*a-b*.

In the example shown in FIGS. 3*a-d*, the base layer 10 is provided with at least one aperture or opening 13. The openings 13 are arranged in the base portion 10*a*. The openings extend between the first surface 11 to the second surface 12.

Figure 3A:
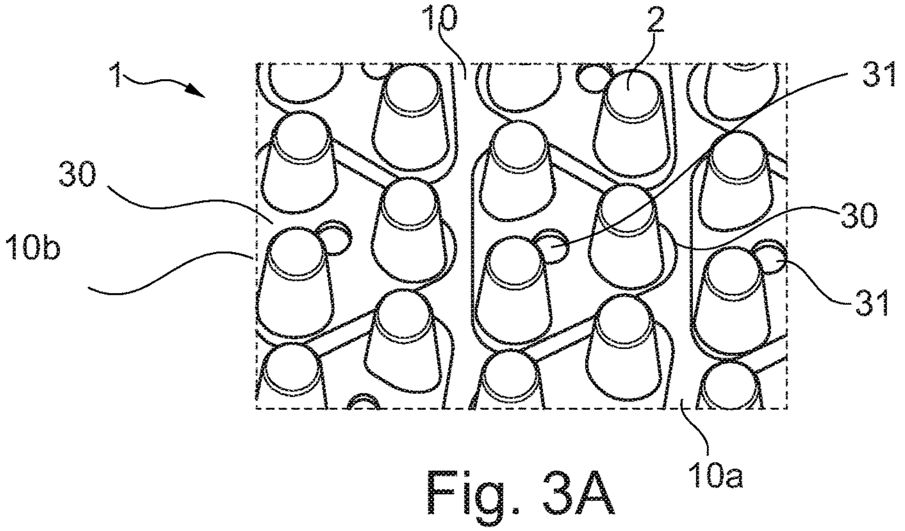
Figure 3B:
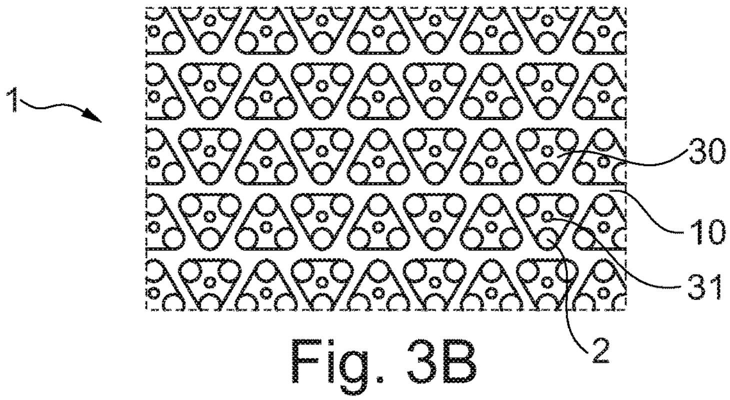
Figure 3C:
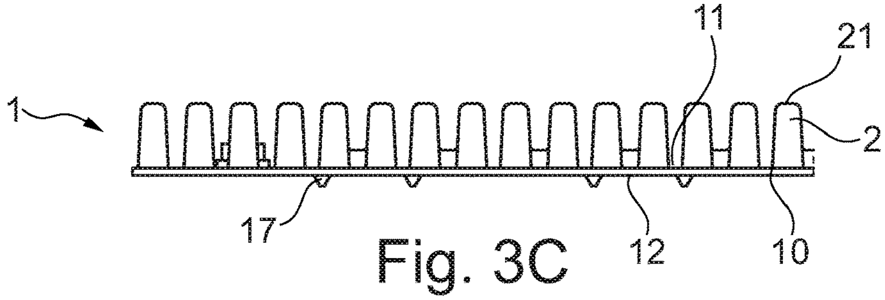

Further, as visible in the side view on FIG. 3*c*, the second surface 12 of the base layer 10 may be provided with anti-slip projections 17. The anti-slip projections 17 may reduce movements between the support structure 1 and any underlying structure, such as a mattress.

As seen in the perspective view from below in FIG. 3*d*, a cavity 14 may be formed underneath the raised portion 30. Air may circulate in the cavity.

The cavity 14 may be formed such that a finger 2 of another support structure 1 may be received in the cavity 14. Thereby, support structures 1 may be stacked on each other and interlocked to co-join support structures by fingers 2 being received in the cavity 14.

Figure 3D:
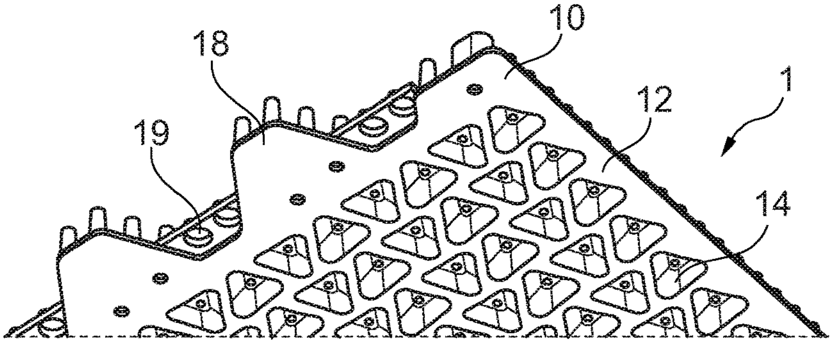

The example shown in FIG. 3*d* is also provided with a connecting system 18, 19 along one edge of the support structure 1. The connecting system 18, 19 will be described in more detail in relation to FIG. 9*a-b*.

The raised portion 30 may have different shapes and include a different number of fingers 2, which will be shown with reference to FIGS. 4*a-g*. Material, dimensions, and ratios described above are applicable also for the examples shown in FIGS. 4*a-g*.

Figure 4A:
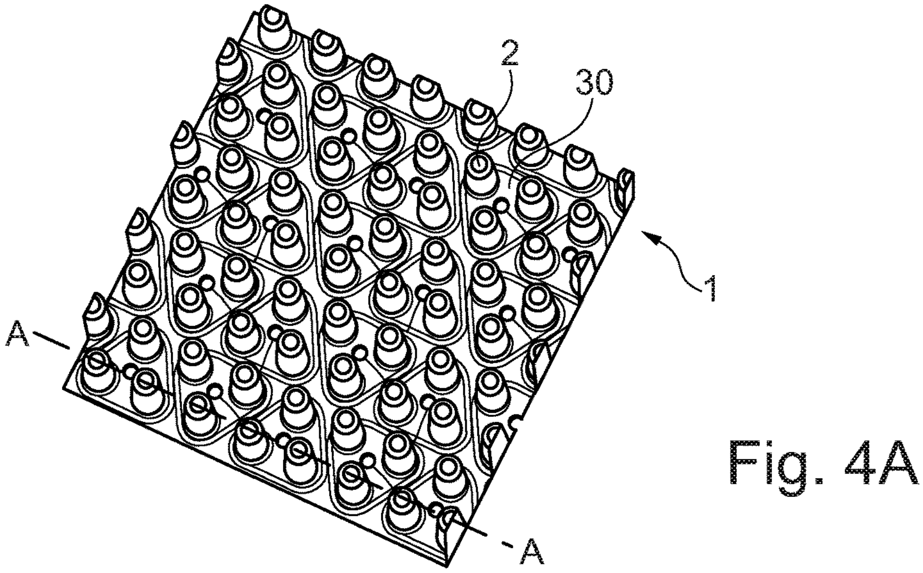
Figure 4B:
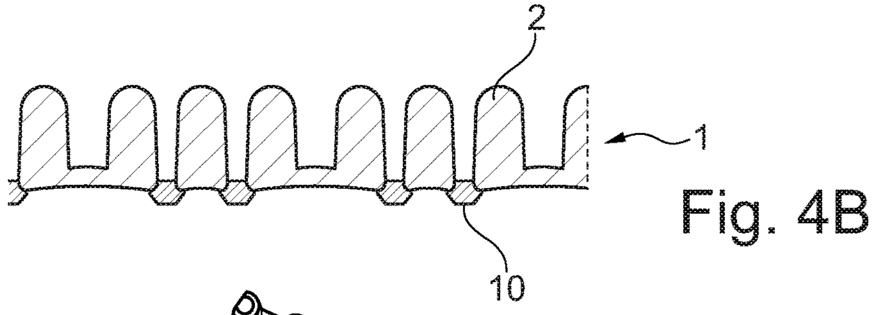

The raised portions 30 of the support structure 1 shown in FIG. 4*a*, with cross-section along line A-A shown in FIG. 4*b*, corresponds to the raised portions 30 of the support structure described above with reference to FIGS. 3*a-d*. As described above, the raised portion 30 has a triangular shape and three fingers 2 extend from the raised portion. Reference is made to the description of the raised portion 30 and support structure 1 in FIGS. 3*a-d* for a description of FIGS. 4*a-b*.

Figure 4C:
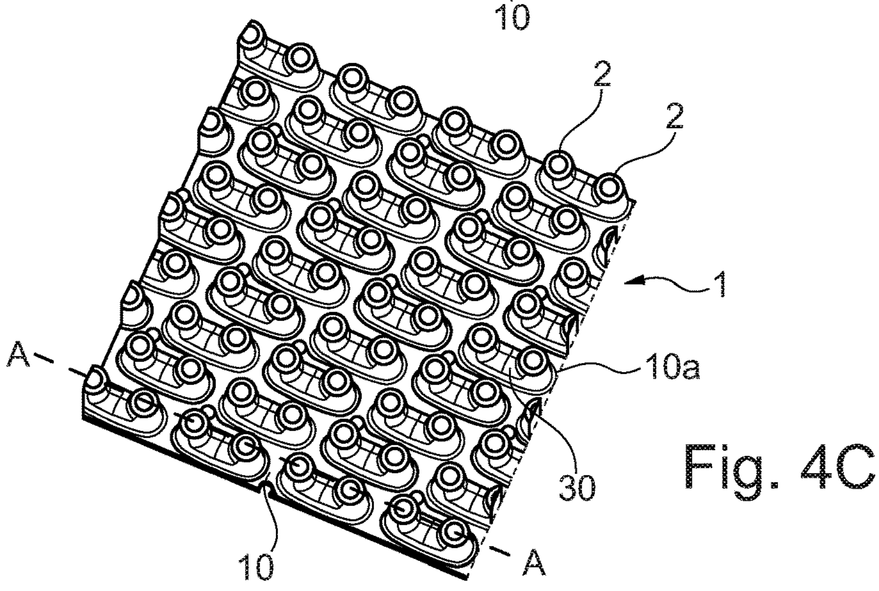
Figure 4D:
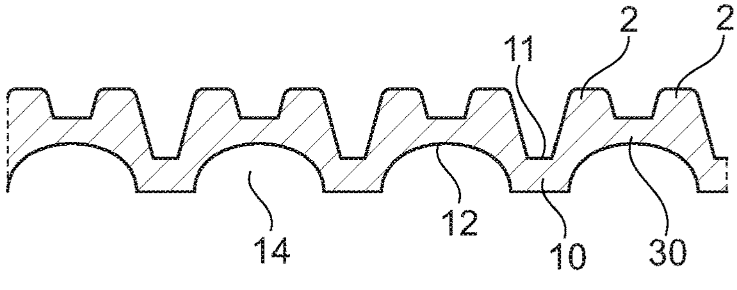

The support structure 1 shown in FIG. 4*c*, and with cross-section along A-A shown in FIG. 4*d*, shows an example of a raised portion 30. The raised portion 30 in FIGS. 4*c-d* has an oblong shape. Two fingers 2 extend from each raised portion 30. The two fingers 2 are arranged at ends of the oblong shaped raised portion 30. An intermediate part of the raised portion 30 extends between the fingers 2 positioned at the same raised portion 30. The intermediate part may be designed to reduce bending of the fingers 2, or may be designed to increase displacement of the raised portion 30 as being the deformable portion 10*b*.

Between the raised portions 30, the base portion 10*a* of the base layer 2 extends.

A distance between the raised portions 30 may vary.

Figure 4E:
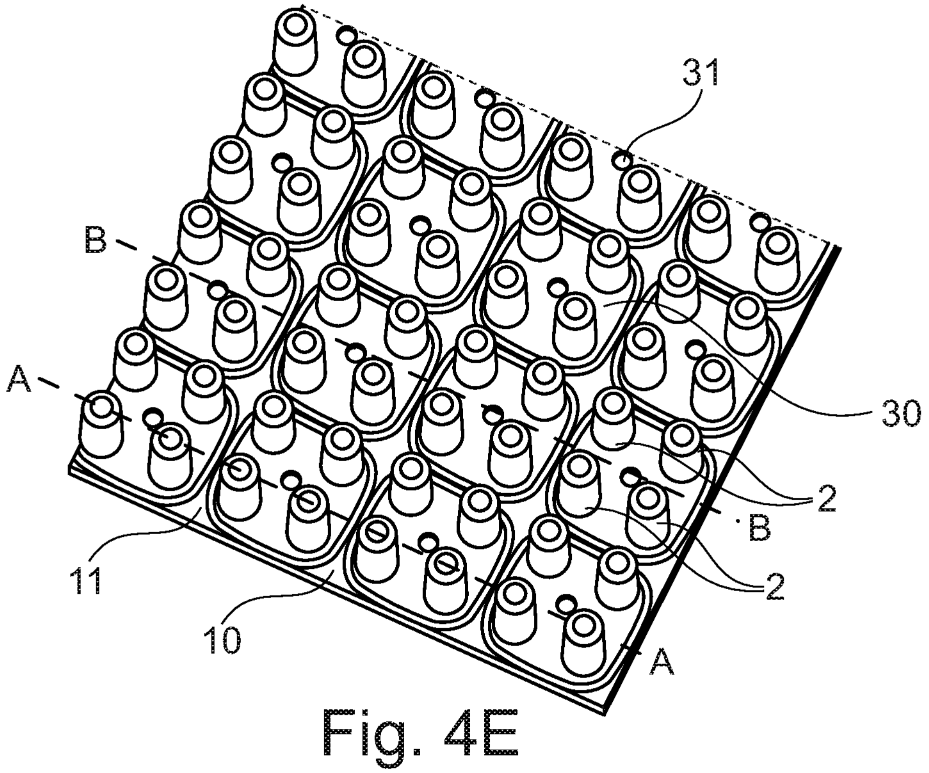
Figure 4F:
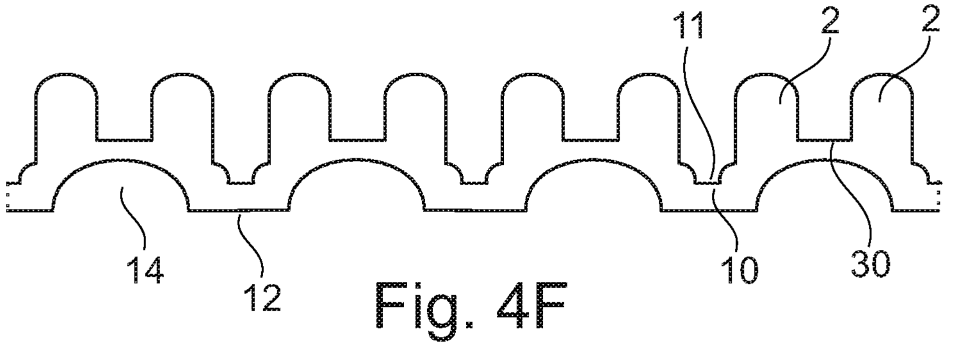
Figure 4G:
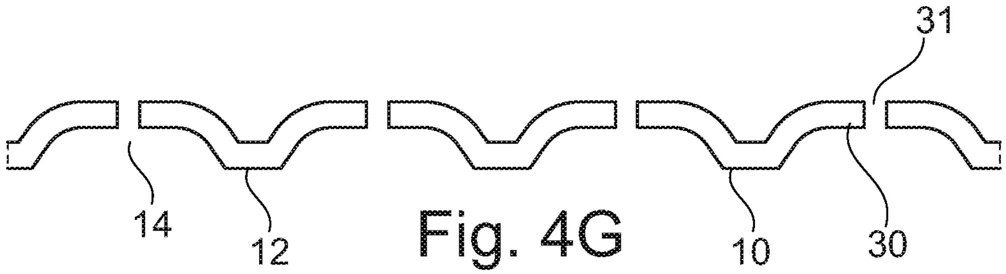

An example of a raised portion 10 of the support structure 1 is shown in FIG. 4*e*, with cross-section along line A-A is shown in FIG. 4*f*, and cross-section along line B-B is shown in FIG. 4*g*. In the example shown in FIGS. 4*e-g*, the raised portion 30 has a rectangular shape. The raised portion 30 has a square shape. Four fingers 2 are extending from each raised portion 30.

An opening 31 is arranged in the raised portion 30.

In the examples discussed with reference to FIGS. 3*a-d* and 4*a-g*, each raised portion 30 defines a group of fingers 2. In other example, the fingers 2 may be positioned on the base layer 10 such that groups of fingers 2 are formed. For example, in a group of fingers, a distance between a number of fingers 2 may be less than a distance to fingers 2 forming another group of fingers 2. A number of fingers 2 may be positioned such that the fingers 2 define a certain shape such that a group of fingers 2 is formed.

In the examples shown in FIGS. 4*a-g*, the number of fingers 2 per raised portion 30, or per group of fingers 2, are equal. In another example, the number of fingers 2 per raised portion 30, or per group of fingers, may differ from one raised portion 30 to another raised portion 30.

Figure 5A:
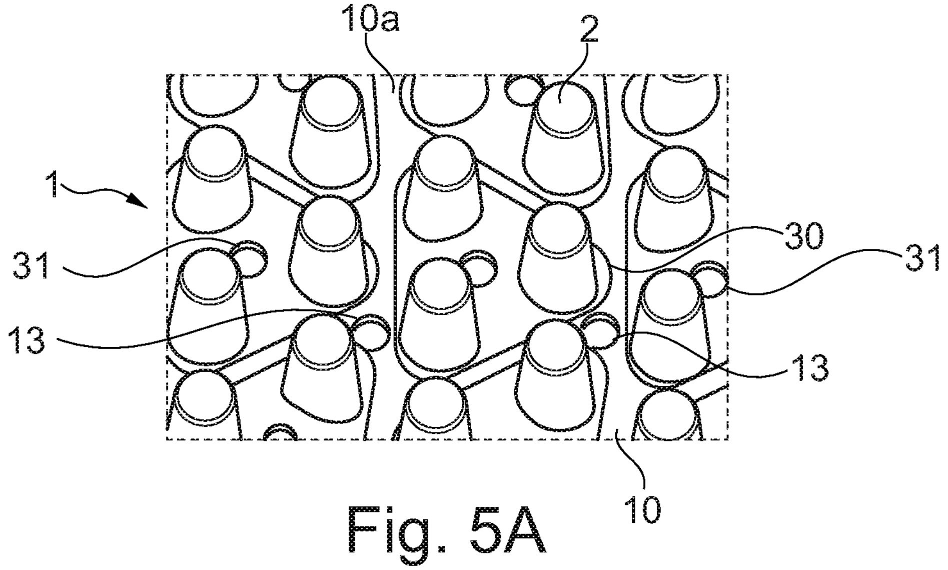
FIGS. 5*a-c* shows example of a support structure.
Figure 5B:
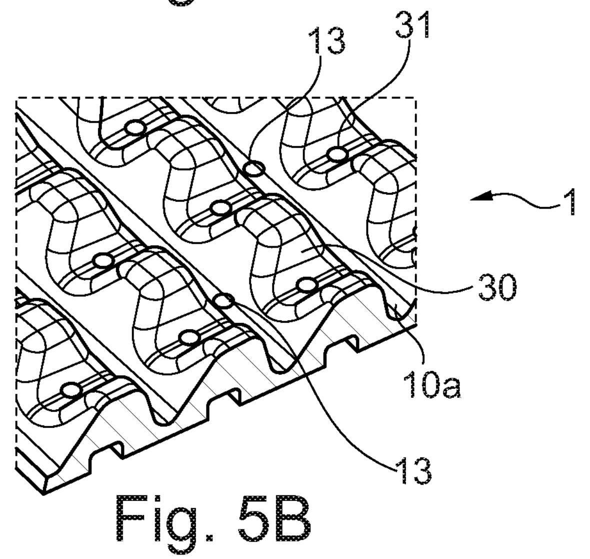
Figure 5C:
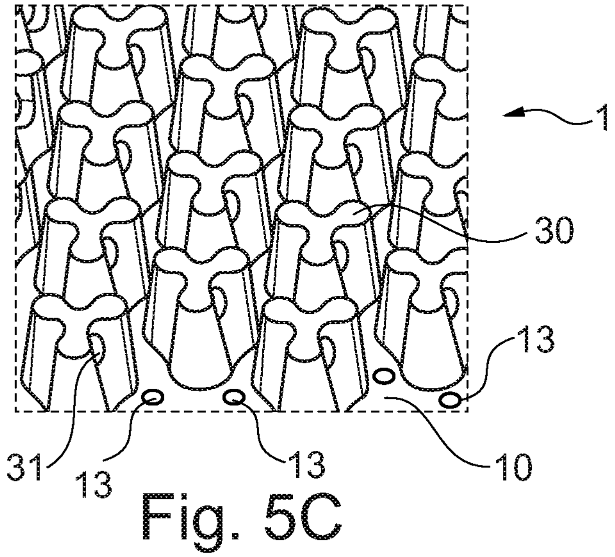

FIGS. 5*a-c* shows examples of the support structure 1 provided with openings or apertures at different levels.

FIG. 5*a* shows an example of a support structure 1 similar to the support structure 1 described above with reference to FIGS. 3*a-d*. The base layer 10 is provided with an opening or aperture 13 extending through the base portion 10*a*. The opening 13 extends between the first surface 11 and the second surface 12 of the base portion 10*a*. In addition to the opening or aperture 13 in the base portion 10*a*, the raised portion 30 has an opening or aperture 31 extending through the raised portion 30. The opening 31 of the raised portion 10*b* is positioned at a distance from the base portion 10*a*, as seen in a direction parallel to the axial direction. In the example shown in FIG. 5*a*, the opening 31 is positioned at an uppermost part of the raised portion 30. As previously described, a cavity may be provided underneath the raised portion 30.

In one example, the openings 31 may form a second set of openings 31, wherein the openings 13 in the base portion 10*a* may form a first set of openings 13.

By having openings or apertures 13, 31 at different levels, fluids may pass through the opening 13 in the base portion 10*a*, and air may still flow through the opening or aperture 31 in the raised portion 30.

FIG. 5*b* shows another example of a support structure 1 provided with openings or apertures on different levels. The raised portion 30 in the example shown in FIG. 5*b* includes one finger 2. Alternatively, the raised portion 30 itself may be considered as forming the finger 2. A portion overbridging between two adjacent raised portions 30 is provided with an opening 31. The base portion 10*a*, extending between the raised portion, is provided with an opening 13. The opening 31 of the portion overbridging between two adjacent raised portions 30 is positioned at a distance from the opening of the base portion 10*a* in a direction parallel to the axial direction.

In the example shown in FIG. 5*b*, a surface area of the distal end 21 of the finger 2 is comparable larger compared to a surface area of the distal end 21 of the finger 2 in the example shown in FIG. 5*a*.

In the example shown in FIG. 5*c*, the fingers 2 has a substantially planar top surface. In the example shown in FIG. 5*c*, the finger 2 has an asymmetric shape. The finger 2 is formed of a three-legged member, wherein the legs extend from a centre point of the finger 2. The three-legged member has a conical shape.

An opening or aperture 13 is provided in the base portion 10*a* extending between the fingers 2. An additional opening or aperture 31 is provided in at least one of the side surfaces of the three-legged member forming the finger 3.

The opening 31 of the three-legged member is positioned at a distance from the opening 13 in the base portion 10*a*.

Figure 6:
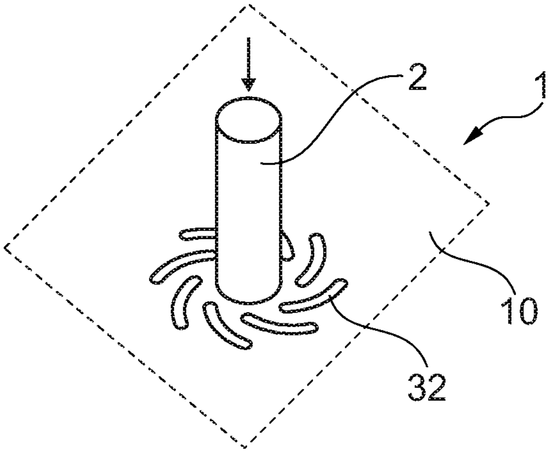
FIG. 6 shows an example of a support structure having a deflection member.

FIG. 6 shows a part of a support structure wherein the deformable portion 10*b* is provided with a deflection member 32. The deflection member 32 may increase the ability of the deformable portion 10*b* to deflect or to be displaced under pressure applied on the finger 2. The deflection member 32 may be provided in form of slots and/or perforation. The slots and/or perforations may be arranged around the finger 2. The slots and/or perforations may extend at least partly through the base portion 10*a*.

Figure 7:
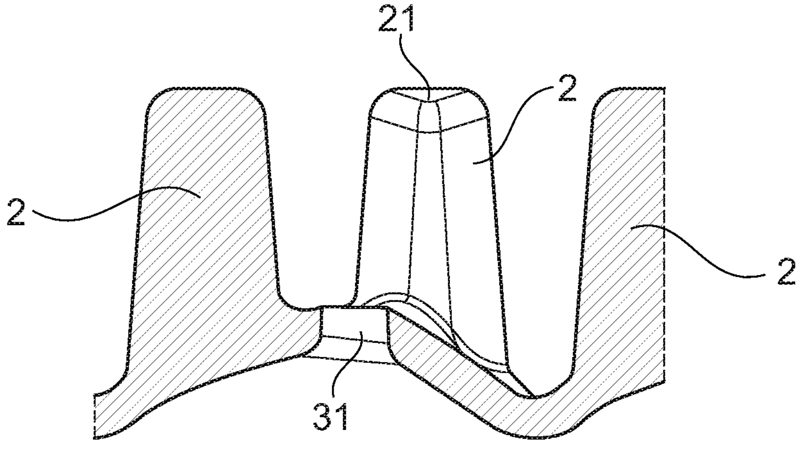
FIG. 7 shows a cross-sectional view of an example of the support structure.

FIG. 7 shows a cross-sectional view of fingers 2 of the support structure 1 in an example wherein the fingers 2 are extending from the raised portion 30. The raised portion 30 is provided with an opening or aperture 31 extending through the raised portion 30.

FIG. 7 shows in more details a rounded shape of the distal end 21 of the finger 2. FIG. 7 shows further the conical shape of the finger 2. The finger 2 tapers towards the distal end 21. A draft angle of the finger 2 may be at least 2.5°. A surface of the distal end 21 may be substantially planar, as shown in FIG. 7, or may be convex.

Figure 8A:
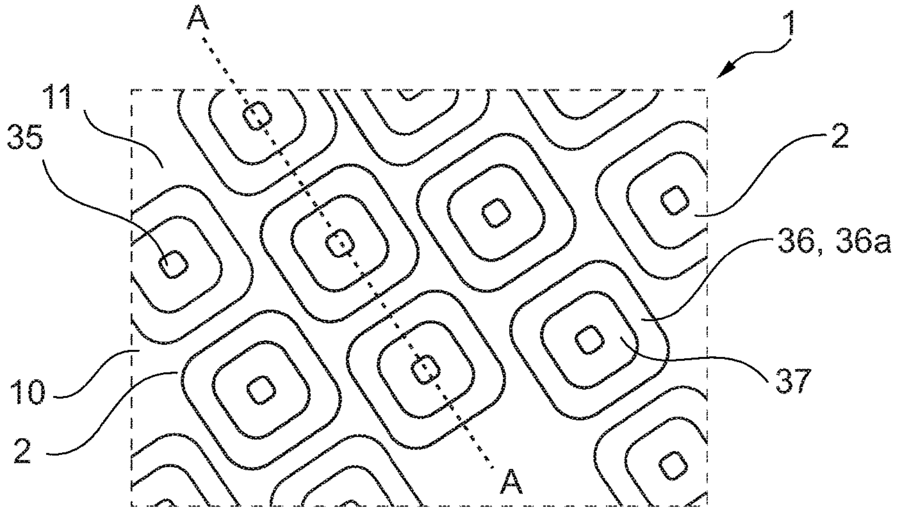
Figure 8B:
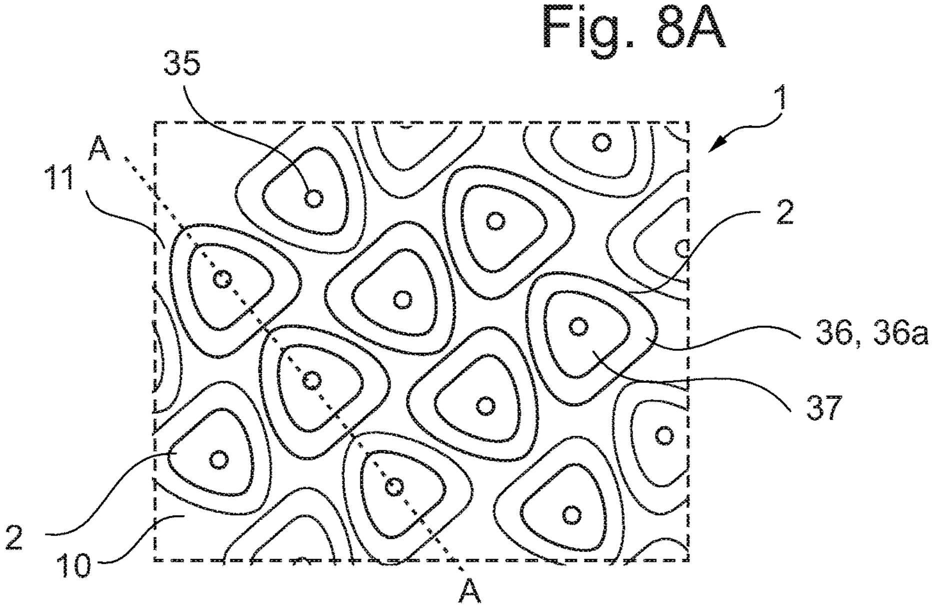
Figure 8C:
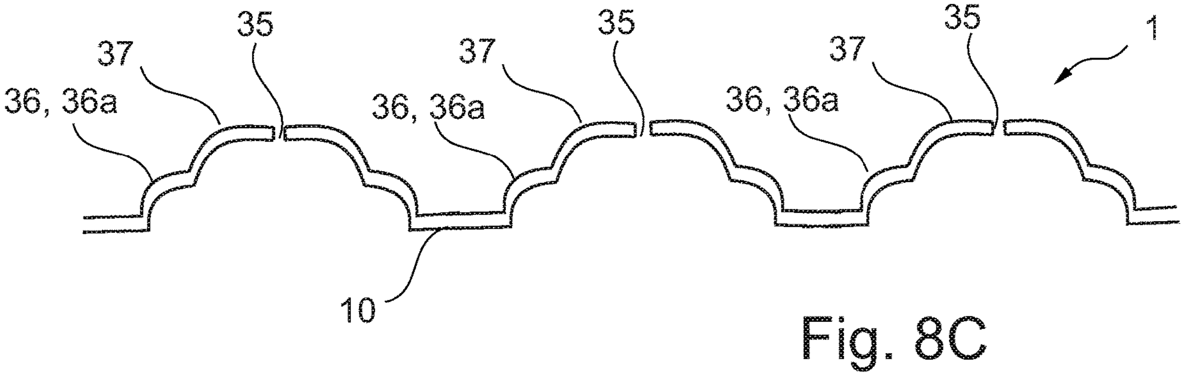

FIG. 8*a-c* shows examples of a portion of a support structure 1. In the examples shown in FIGS. 8*a* and 8*b* the fingers 2 have a distal end 21 having a surface area being larger compared to the examples of the fingers 2 described above with reference to FIGS. 1-7. The material of the support structure 1 may be the same as in the previously described examples of the support structure described above with reference to FIGS. 1-7.

The support structure 1 in the examples shown in FIGS. 8*a-c* comprises individual fingers 2 extending from the upper surface of the base layer 10. The fingers 2 may have a rectangular shape as in FIG. 8*a*, or may have a triangular shape as in FIG. 8*b*. Any other shapes are also considered, such as circular, square, pentagon, oval, crescent, asterisk, toroid or obround shape. The fingers 2 may be similar to the raised portions 30 in the examples described above.

The fingers 2 of the example of the support structure 2 shown in FIGS. 8*a-c* may be intended to support parts of a body wherein a resulting pressure is high, such as heels, arms, head. The examples are suited for parts of body being sensitive to high pressure, and/or parts with sensitive and/or fragile skin.

The fingers 2 may be provided with at least one opening 35 at its upper surface. The upper surface is intended to support and/or contact a body, or a part of a body.

The fingers 2 may comprise a base portion 36 and an upper portion 37, extending from the base portion 36. The upper portion 37 may form the support surface of the finger 2. The base portion 36 may be in form of a finger base projection 36*a* extending from the upper surface 11 of the base layer 10.

The fingers 2 may be more rigid than the deformable portion 10*b* surrounding the fingers 2, as discussed above.

In the examples shown in FIGS. 8*a-c*, a planar extension of the finger 2 in a direction substantially parallel to a plane of the base layer 10 may exceed a height of the finger 2 in a direction substantially perpendicular to the plane of base layer 10.

In one example, the finger base projection 36*a* disclosed in FIGS. 8*a-c* may form the intermediate portions 15 described above with reference to FIGS. 1-7.

The deformable portions 10*b* of the base layer may be more flexible than the intermediate portions 15 formed by the finger base projection 36*a*.

In an alternative example, the finger base projection 36*a* disclosed in FIGS. 8*a-c* may form the raised portion 30 described above with reference to FIGS. 1-7. In this example, the upper portion 37 of the finger 2 may be more rigid than the base portion 36 of the finger 2. The raised portion 30 may form the deformable portion 10*b*.

In one example, the finger base projection 36*a* disclosed in FIGS. 8*a-c* may form the deformable portion 10*b*.

Figure 9A:
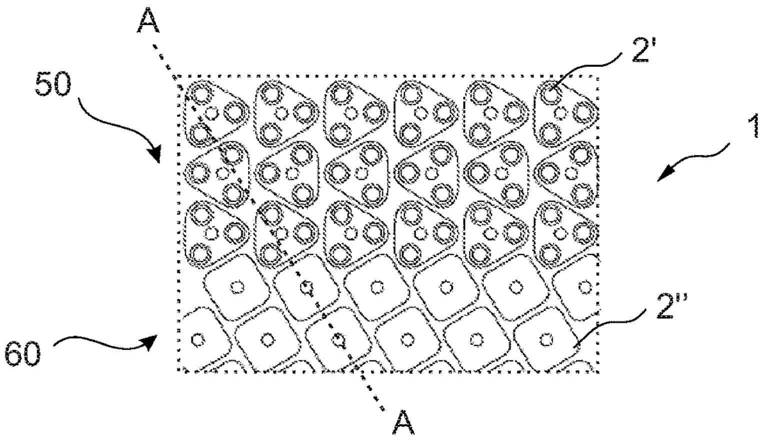
Figure 9B:
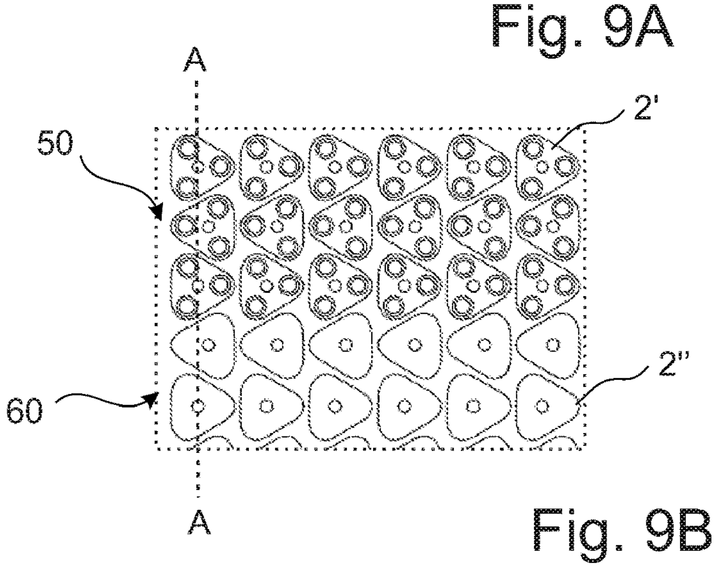
Figure 9C:
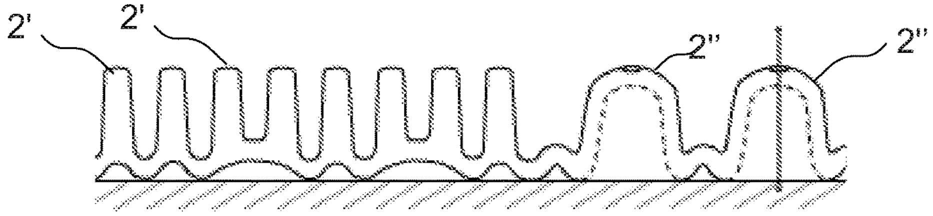

FIGS. 9*a-c* illustrates an example of a support structure 1 having at least a first portion 50 and at least a second portion 60. The first portion or portions 50 comprises fingers 2' of a first type. The second portion or portions 60 comprises fingers 2" of a second type. The first type of fingers 2' is different from the second type of fingers 2" in at least one aspect. The first type of fingers 2' may be different from the second type of fingers 2" in shape, size, material, hardness, rigidity, design, height, extension, etc.

In the examples shown in FIGS. 9*a-c*, the fingers 2' of the first type is any of the examples described above with reference to FIGS. 1-7, and the fingers 2" of the second type is of examples described above with reference to FIGS. 8*a-c*. In other examples, the fingers 2' and 2" may be of any examples above, wherein the finger 2' of the first type is a finger of one example above, and the finger 2" of the second type is a finger of any other example above. By being other is intended being of another example than the finger 2' of the first type.

In the examples shown in FIGS. 9*a-c*, the fingers 2' of the first type has a triangular shape in FIGS. 9*a-b*. The fingers 2" of the second type has a rectangular shape in FIG. 9*a*. The fingers 2" of the second type has a triangular shape in FIG. 9*b*.

The different types of fingers 2', 2" may be adapted to different parts of the body. The fingers 2" of the second type may be configured to support a part of a body being more sensitive to high pressure.

An extension of the finger 2" of the second type in a direction being substantially parallel to an extension the base layer 10 may be less than a height of the finger 2" of the second type in a direction substantially perpendicular to the extension of the base layer 10.

A height of the finger 2' of the first type in a direction being substantially perpendicular to an extension the base layer 10 may exceed an extension of the finger 2' of the first type in a direction substantially parallel to the extension of the base layer 10.

A surface area of a top surface of the finger 2" of the second type may exceed a surface area of a top surface of the finger 2' of the first type. The top surface may be intended to contact a body, or part of body.

The fingers 2" of the second type may be hollow. The fingers 2' of the first type may be solid.

The fingers 2" of the second type may be more flexible compared to the fingers 2' of the first type. The fingers 2' of the first type may be more rigid than to the fingers 2" of the second type.

In one example, the fingers 2" of the second type may have a substantially similar rigidity as the fingers 2' of the first type. For one example, the deflection of the base layer 10 exceeds the deflection of the fingers 2" as described above with reference to the finger 2. A displacement of the deformable portion 10*b* of the base layer 10 in a direction parallel to the axial direction exceeds a compression of the finger 2" of the second type in the axial direction. the fingers 2" of the second type being more rigid than the deformable portion 10*b* of the base layer 10, the deformable portion surrounding said finger 2". Even if the fingers 2" being less rigid than the fingers 2' of the first type, the deflection of the base layer 10 may still exceed the deflection of the fingers 2" of the second type.

In one example, the fingers 2" of the second type may have a substantially similar rigidity as the fingers 2' of the first type, but may differ from the fingers 2' of the first type in any other aspect, such as material, hardness, rigidity, design, height, extension, etc.

Figure 9D:
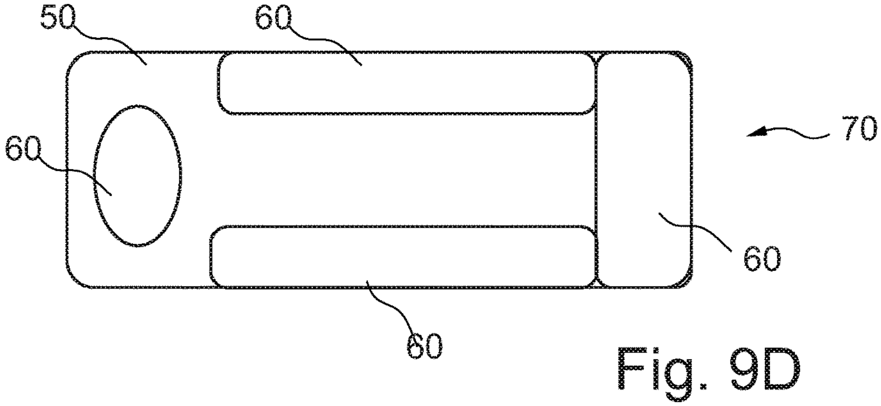
FIG. 9*d* shows a support arrangement.

FIG. 9*d* shows a support arrangement 70 comprising a support structure 1 having at least one first portion 60 and at least a second portion 70 of type described above. The support arrangement 70 may be, or form part of, a mattress, a bed, a seat, cushioning, etc. In the following, the support arrangement 70 will be described with reference to a mattress.

The support arrangement 70 comprises a first portion 60 comprising fingers 2' of a first type. The first portion 60 forms a main surface of the support arrangement 70. The support arrangement 70 further comprises one or more second portions 70 comprising fingers 2" of a second type.

The portions of the support arrangement 70 may be adjusted to different parts of the body, for example, by adapting the fingers 2, 2', 2" of the different portions.

In the example in FIG. 9*d*, a head portion, a foot portion, and hand portions are provided with fingers intended to support parts of a body resulting in a larger pressure per surface area, compared to other part of the body. Such portions are provided with second portions 70, wherein the fingers 2" have different design than in the first portion 60. The fingers 2" of the second portions 70, i.e., the second type of fingers 2", may be configured to support parts of body resulting larger pressure per surface area than other parts of the body. At other parts of the body, such as in the first portion 60, the fingers 2' of the first type, may be configured to support a lower pressure, in comparison with the second portions 70.

Figure 10A:
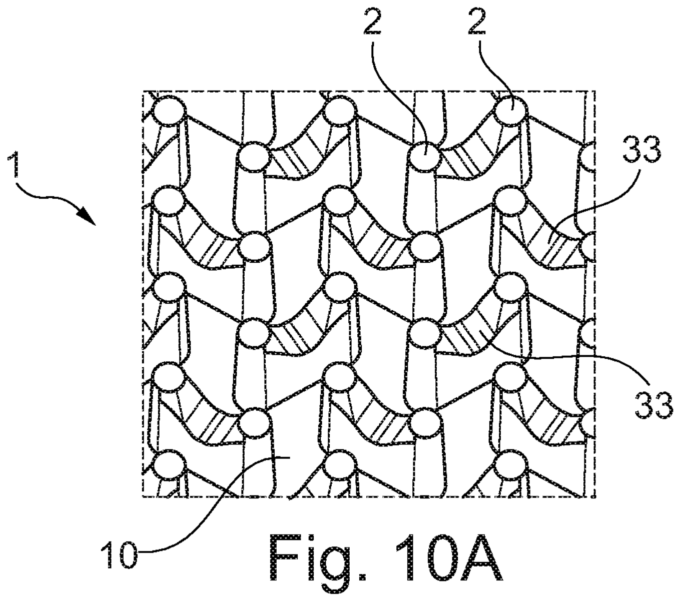
FIGS. 10*a-b* shows examples of a support structure with a distancing arm extending between adjacent fingers.
Figure 10B:
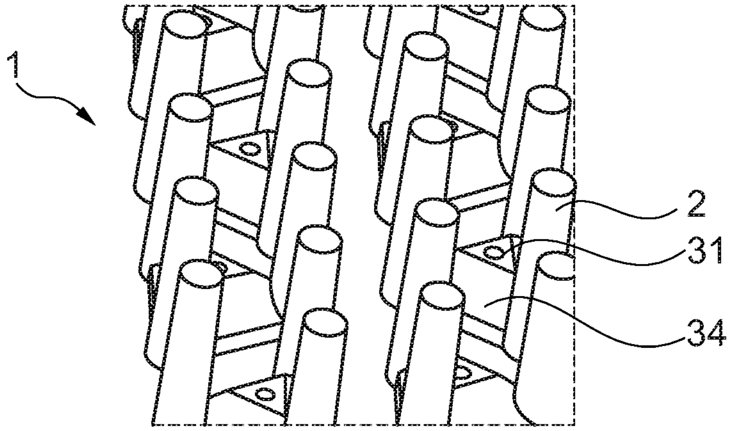

FIGS. 10*a-b* show an example of the support structure 1 provided with a distancing member. In the example shown in FIG. 10*a*, a distancing member in form of a distancing arm 33 is extending between two adjacent fingers 2. The distancing arm 33 is configured to maintain a space between fingers 2 connected by the distancing arm 33 when pressure is applied. The distancing arm 33 may increase rigidity of the fingers 2 connected by the distancing arm 33.

FIG. 10*b* shows another example of a distancing member is shown. In the example shown in FIG. 10*b*, the distancing member 34 is extending between three adjacent fingers 2. The distancing member 34 is configured to maintain a distance D2 between fingers 2 connected by the distancing member 34 when pressure is applied. The distancing member 34 may increase rigidity of the fingers 2 connected by the distancing member 34. Fingers 2 connected by the same distancing member 34 may from a group of fingers 2.

Figure 11A:
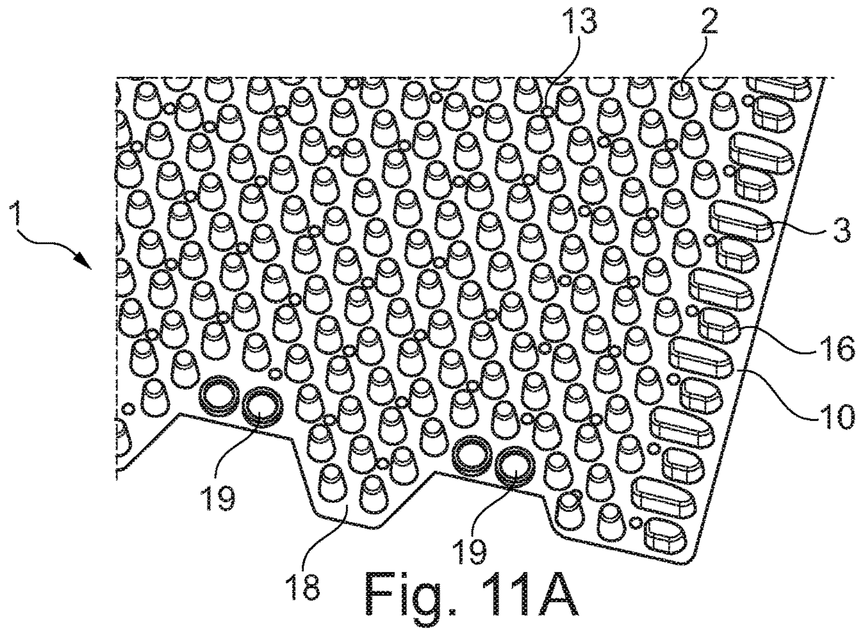
FIG. 11*a-c* shows an example of a perimeter design and a connecting system.
Figure 11B:
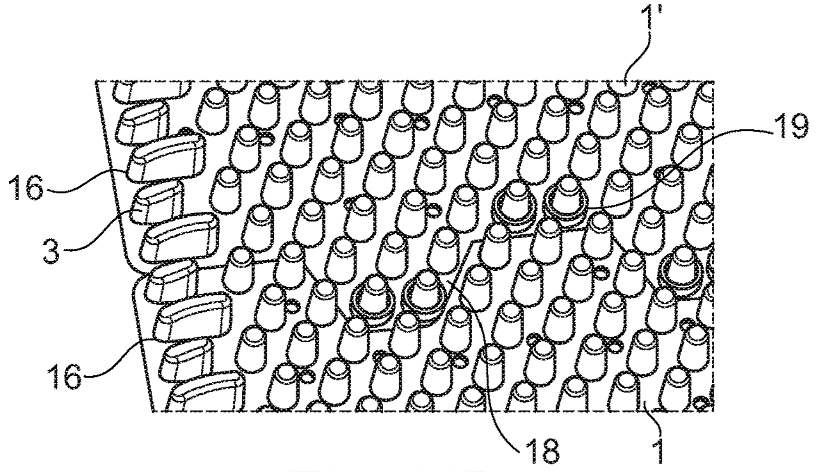

FIGS. 11*a-b* shows an example of a support structure 1 provided with a connecting system 18, 19 at least one edge. The connecting system 18, 19 is configured to connect the support structure 1 to an adjacent support structure 1', as shown in FIG. 11*b*, such that a support surface formed of several support structures 1 may be provided. The connecting system 18, 19 may be configured to connect the support structure to another member.

In the example shown in FIGS. 11*a-b*, an edge of the support structure 1 has a zig-zag shape. The edge is provided with apertures 19 configured to receive a finger 2 or similar or an adjacent support structure 1' or other member. The edge is further provided with at least one projecting tongue 18 having at least one finger 2 being configured to be received in apertures of an adjacent support structure 1' or other member. FIG. 10*b* shows two adjacent support structures 1, 1' connected to each other by fingers 2 at the projecting tongue 18 of one of the support structures 1 being received in apertures 19 of the adjacent support structure 1'.

Figure 11C:
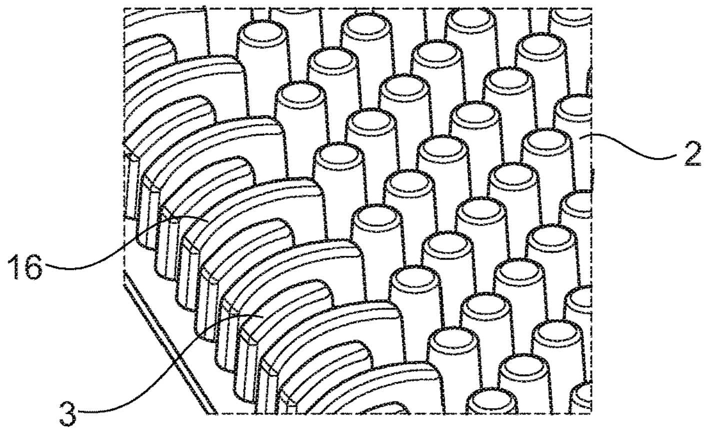

FIG. 11*c* shows an edge of an example of the support structure 1. The edge has a perimeter design wherein shape and size of the fingers 2 at the edge is different from the shape and size of fingers at a centre of the support structure 1. The perimeter design may be configured to facilitate positioning of sheets, covers and similar, and/or to reduce sheets from sliding on the support structure 1.

In the example shown in FIG. 11*c*, the edge is provided with perimeter fingers 16 having an oblong shape. As shown in FIG. 11*c*, the length of the perimeter fingers 16 may differ. The perimeters fingers 16 may also stabilise the edge of the support structure 1. The fingers 2 at the edge may extend in direction transverse to the edge.

Figure 12:
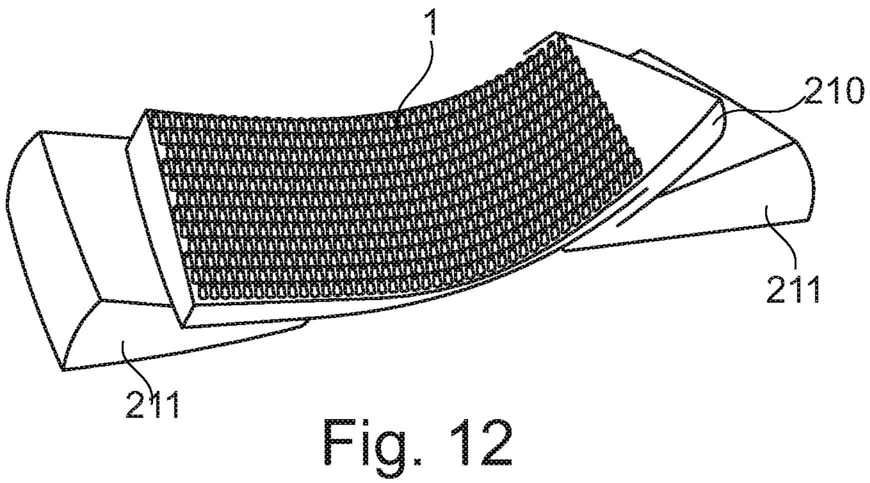
FIG. 12 shows a support structure when arranged on a positioning cushion.

FIG. 12 shows an example of the support structure 1 positioned on a mattress element or positioning cushion 210. The mattress element or positioning cushion 210 may be included in a positioning system including the mattress element or positioning cushion 210 and positioning pads 211 configured to support a body, part of body, or object. The support structure 1 may be included in the mattress 210, be attached to the mattress element or positioning cushion 210, or be positioned on the mattress without being attached to the mattress. A sheet may be positioned between the support structure 1 and the body, part of body, or object.

Any type of cover may be positioned between the support structure 1 and the body, part of body, or object. Such a cover may act as a membrane. Such a membrane may be intended to further reduce friction between the body, part of body, or object, and the support structure 1.

Several support structures 1 may be connected as described above with reference to FIGS. 9*a-b* to form a support structure 1 having a larger area.

Figure 13:
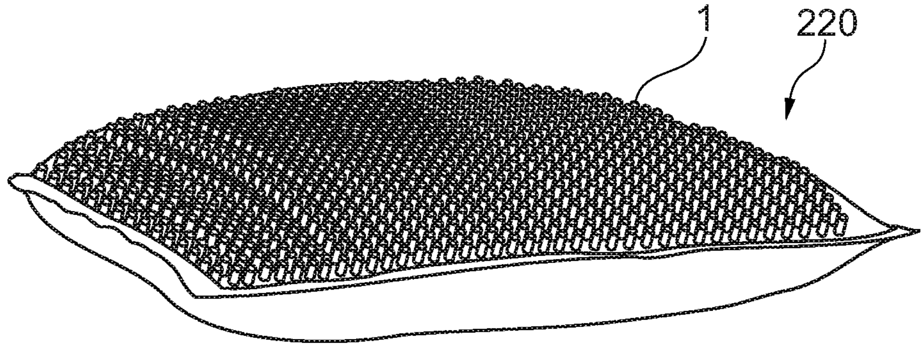
FIG. 13 shows a support structure when arranged on a pillow.

FIG. 13 shows a pillow or cushion 220. The support structure 1 may be included in, positioned on, or attached to the pillow or cushion 220. In one example, the support structure 1 is positioned on or attached to a pillow or cushion cover.

The support structure 1 may be formed of a material being washable. If the support structure 1 has been in contact with body fluids, the support structure 1 can be washed and re-used after washing. The support structure 1 can be re-used, while the underlying structure, such as the mattress 210 and pillow 220 is disposed.

Figure 14:
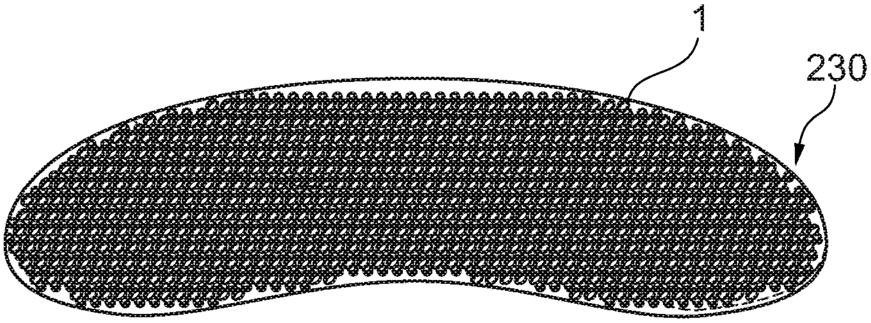
FIG. 14 shows a dressing including a support structure.

FIG. 14 shows a dressing 230 including the support structure 1. A surface of the dressing 230 configured to contact the user of the dressing 230 may be provided with a protective cover (not shown). The shape of the dressing 230 may be adapted to the intended use of the dressing.

Figure 15A:
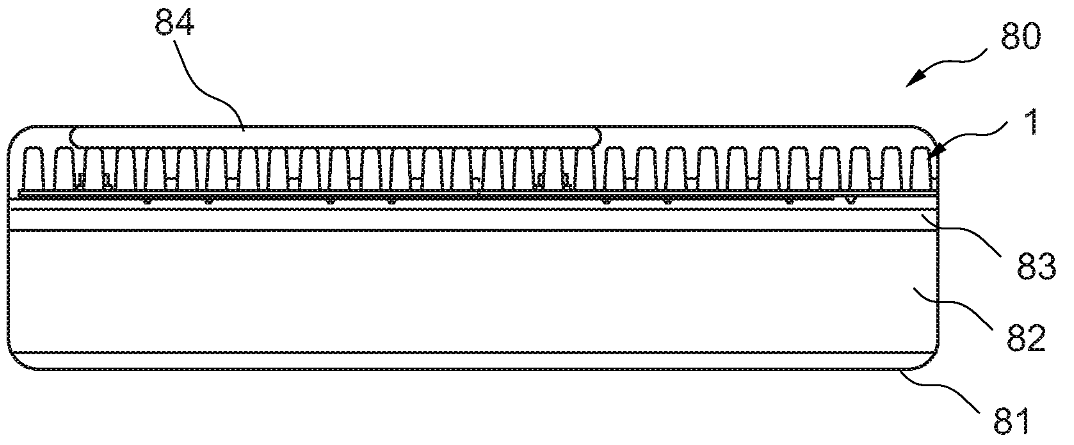
FIG. 15*a-c* shows a support arrangement.
Figure 15B:
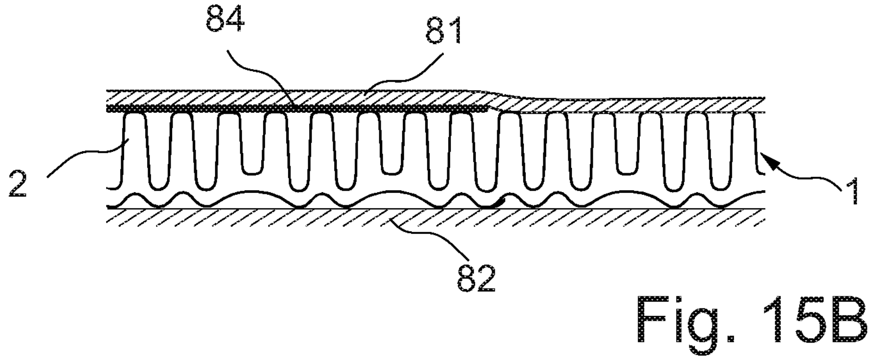
Figure 15C:
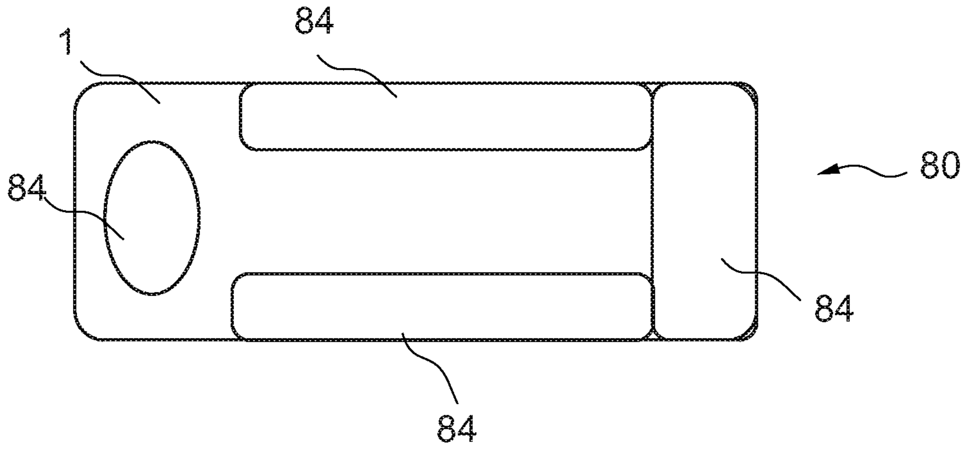

FIGS. 15*a-c* illustrates a support arrangement 80, wherein in FIG. 15*a*, the support arrangement is shown in cross-section. The support arrangement 80 may be, or form part of, a mattress, a cushioning, a seat, pillow, cushions, furniture, etc.

The support arrangement 80 comprises at least a core layer 82, a first support structure 1, and a cover 81 at least partially covering support structure 1.

The first support structure 1 may be of any of the examples of the support structure described above with references to FIGS. 1-14. The lower surface 12 of the base layer 10 is facing the core layer 82. The fingers 2 are configured to face away from the core layer 82.

The core layer 82 may be a foamed substrate, such as a cold foamed substrate. The foamed material may be polyurethane. In other examples, the core may comprise a mattress base layer.

The cover 81 may at least partially enclose the support structure 1 and the core layer 82. The cover 81 may be water resistant. The cover 81 may be permeable. The cover 81 may be made of a bacteriostatic and/or fungistatic a material. The cover 81 may be a sheet. The cover 81 may be textile layer.

The cover 81 may form a protective layer of the support arrangement 81. The cover 81 may enclose the support arrangement 81 and form an outermost layer of the arrangement.

Optionally, an intermediate layer 83 may be arranged between an upper surface of the core layer 82 and the lower surface 12 of the base layer 10 of the support structure 1. The intermediate layer 8 may be a prevention mat. The intermediate layer 83 be made of a thermoplastic material, an elastomer and/or rubber. The intermediate layer 83 may reduce heat conductive between the support structure and the core. The intermediate layer 83 may prevent fluids from entering into the core layer.

In one example, a second support structure 84 is arranged above the first support structure 1. The second support structure 84 may partially cover the first support structure 1. The second support structure 84 may partially extend over the first support structure 1 in a plane substantially parallel to the base layer 10 of the first support structure 1.

The cover 81 may enclose the core layer 82, the optional intermediate layer 83, the first support layer 1, the optional second support layer 84.

As seen in more details in FIG. 15*b*, showing a detail of the support arrangement in FIG. 15*a*, the second support structure 84 may be provided with protuberances (not shown). The protuberances may be configured to extend in direction towards the fingers 2 of the first support structure 1.

The second support structure 84 may be formed of a polymeric material, such as a thermoplastic material. The polymeric material may be an elastomer, for example a thermoplastic elastomer. The polymeric material may be formed of silicone rubber. The second support structure 84 may be formed by additional layers of fabric, polymers or elastomers added to the cover 81, for example to create a greater pressure area effect over a uniform surface of support fingers and finger dimensions and properties The cover 81 and/or the second support structure 84 may be produced by several means alone or in combination, for example, by coating of sections of the cover, lamination of materials as an assembly step, co-extrusion of films to form laminations, textile weaving in varied densities, brushing or fleecing of selected areas of the cover surface, production of thin film foams in varied densities, including skinned foam sheets.

The cover 81 and/or the second support structure 84 may formed of polymer or polymerized textiles or fabrics made to achieve the desired porosity, microporosity, breathability, conveyance of gases and fluids (for example humidity, sweat or exchange of air), stretch, load distribution, pressure distribution or hammocking between fingers. Examples of materials having similar functions are shown in Gore-Tex® fabrics, fleeced or brushed spandex fabrics, fleeces and micro-fleece, spun or nano-spun materials, or other woven and or laminated materials designed to convey heat and moisture or, in combination of layers or in a single layer, achieve an effective porosity and breathability. The membrane surfaces may also be designed as hydrophobic as desired to deflect fluids or allow for cleaning with fluids.

The second support structure 84 may have a different design than the first support structure 1.

The second support structure 84 may free from fingers of type provided on the first support structure 1.

In one example, the second support structure 84 may comprise a plurality of protuberances extending from a base layer of the second support structure 84. The protuberances of the second support structure 84 may be different from the fingers of the first support structure 1 in term of shape, extension, material, etc.

The second support structure 84 may further contribute the pressure, and may be configured to be positioned to support parts of a body resulting in comparable higher pressure per surface area, such as heels, head, hands, etc.

The second support structure 84 may be attached to a lower side of the cover 81, intended to face the first support structure 1. The second support structure 84 may be provided in form of rolls. The second support structure 84 may be configured to be cut into suitable shape and size to improve pressure distribution at certain areas of the support arrangement 80. The second support structure 84 may be configured to be positioned at positions wherein improve pressure distribution is desired.

The cover 81 may be provided with sensors. The sensors may be arranged in a surface of the cover 81 intended to face the first support structure 1. The sensors may be attached to the cover 81, or may be arranged between the cover 81 and the support structure 1 and/or second support structure 84. The sensors may be of the type described below.

FIG. 15*c* illustrates a partial extension of the second support structure 84 of the support arrangement 80 as seen from above. On portions of the support arrangement 80, the second support structure 84 is extending over the first support structure 1, such that the second support structure 84 is arranged intermediate the first support structure 1 and the cover 81 at said portions of the support arrangement 80.

The second support structure 84 may be provided at positions intended to support parts of the body resulting in a comparable higher pressure per surface area. Such positions may, in an example wherein the support arrangement 80 form, or form part of a mattress, be at a head position, heel position, arm position, etc. The second support structure 84 may further contribute to improve pressure distribution. The second support structure 84 may distribute the pressure from the fingers of the support structure 1.

The support structure 1 in any one of FIGS. 1-15 may be provided with a sensor system, which will be described below with reference FIGS. 13*a-e*.

FIG. 16*a-e* and FIG. 17 shows examples of a sensor system which may be included in the support structure 1. The sensor system may include one or several sensors. The sensors may be sensors configure to detect micro blood-flow in the adjacent tissue, temperature, moisture, shear, patient positioning maintenance, wear, and any combination thereof. The sensors may be configured to be integrated in the fingers 2, in the base layer 10 or any other part thereof. Data accumulation, transmission, and readout electronics, including audio/visual/haptic feedback user interfaces and alarms, may also be integrated into the support structure.

Data may be transmitted to an external user interface device such as a monitor or mobile device including an interface app.

One example of a sensor may be an RFID chip, for example an ultra-high frequency (UHF) RFID chip, for monitoring support system age, cycles of use, wear, washing cycles and process, function, and effectiveness. This chip may be capable of storing use information and transmitting information to interface devices. The UHF-RFID chip may be attached to or integrated into the support system 1, for example by adhesives, thermal fusion or insert moulding.

Figure 16A:
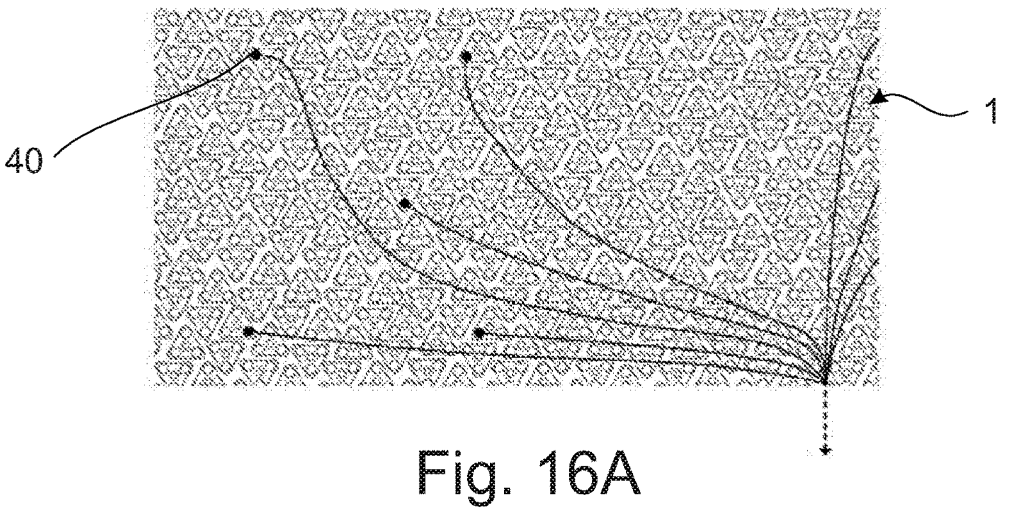
FIGS. 16*a-e* shows examples of a support structure with sensor arrangements.

FIG. 16*a* shows an example of a support structure 1 including a sensor arrangement. Sensors 40 are positioned in the support structure 2, for example on fingers 2 and/or in the base layer 10. In the arrangement in FIG. 16*a*, the sensors are connected by cables to an external device.

Figure 16B:
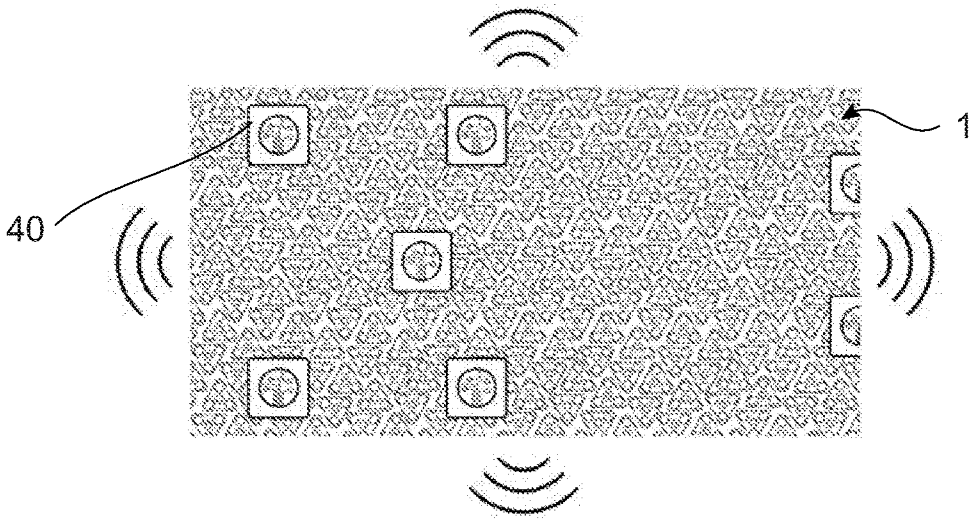

FIG. 16*b* shows an example of a support structure 1 including a sensor arrangement. Sensors 40 are positioned in the support structure 2, for example on fingers 2 and/or in the base layer 10. In the arrangement in FIG. 16*b*, the sensors 40 are configured to transmit data wirelessly to an external device. The sensors may be RFID tags, such as UHF RFID tags.

Figure 16C:
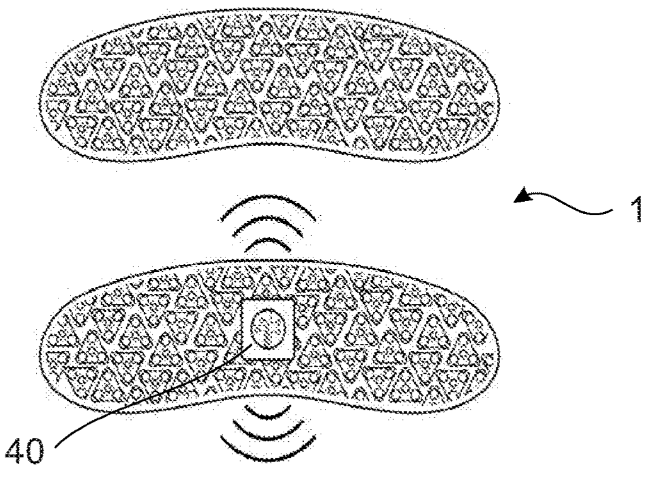
Figure 16D:
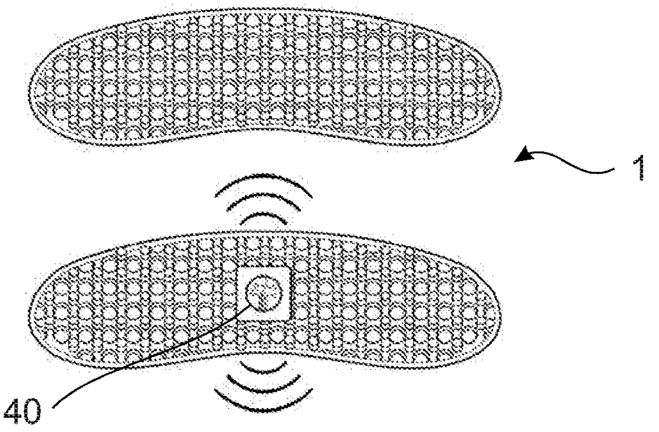
Figure 16E:
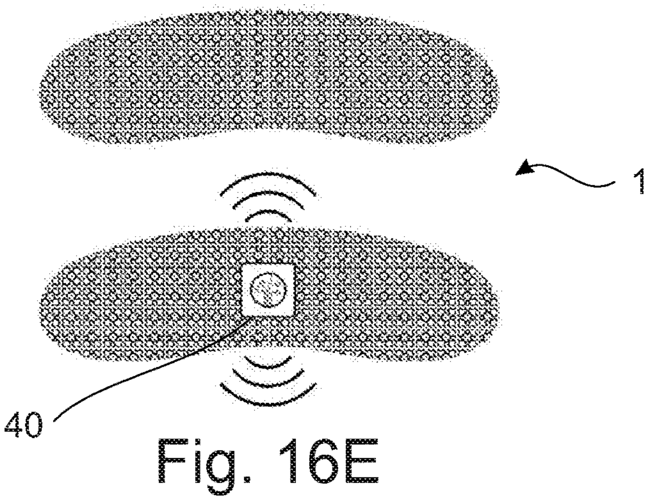

FIGS. 16*c-e* shows three examples of support structures 1 configured to form part of, or form, dressings. The support structures are provided with sensors. In the arrangements in FIG. 16*c-e*, the sensors 40 are configured to transmit data wirelessly to an external device. The sensors 40 may be RFID tags, such as UHF RFID tags.

Sensors 40 may be integrated into the contact surface in selected positions to measure the various parameters in locations of greatest value for user or device monitoring. Integration of sensors may be achieved by insert moulding or by assembling sensors to the support surface.

Sensors 40 may be of a form that are suitable for integration into a finger 2 of a matrass or of a flatter construction to fit into the base layer 10 of a thinner dressing or be positioned between fingers 2 and relatively parallel to the plane of the base layer 10.

Figure 17:
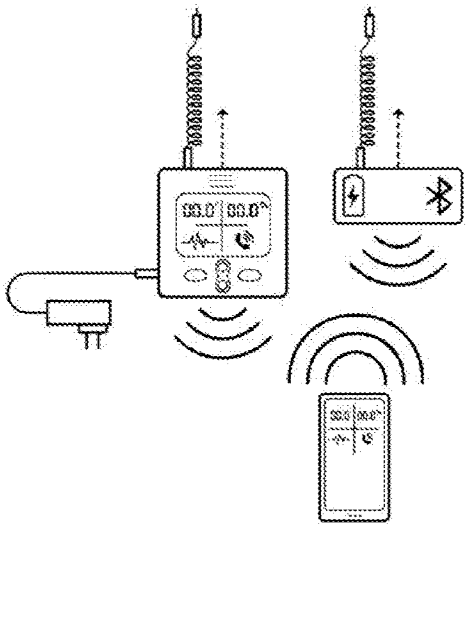
FIG. 17 discloses a system including a support structure and a sensor system.

FIG. 17 shows examples of devices used to monitor sensors 40 included in the support structure 1. The device may be a portable device such as a mobile phone.

Figure 18:
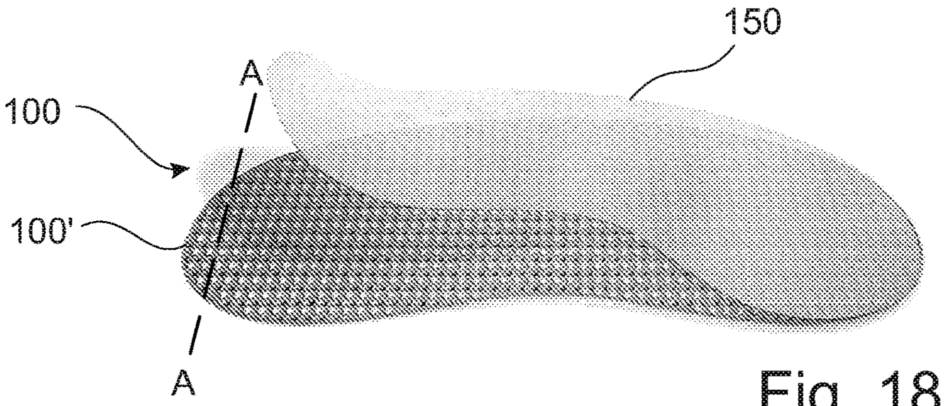
FIG. 18 shows a support structure in form of a dressing.

FIG. 18 shows an example of a support structure 100. The example of the support structure in FIG. 18 is provided with a protective layer 150. The protective layer 150 may be removable. The protective layer 150 may protect an adhesive surface of fingers 2 of the support structure, as will be described below.

The example of the support structure 100 in FIGS. 18 and 19*a-e* will be described as being a dressing 100', or forming part of a dressing 100'. In other examples, the support structure 100 described with reference to FIGS. 18 and 19*a-e* may be used in conjunction with, form part of, or be included in, among other medical devices, assistive device, vehicles, furniture, seats, clothing and footwear, safety equipment, transportation devices, lifting devices, positioning devices, bed systems, and bedding. Examples of assistive devices may be canes, crutches, walkers, wheelchairs, and shower chairs. Examples of bed systems and beddings may be mattresses, mattress covers, pillow, pillow covers, cushions, pillow cushions. Examples of use in vehicles may be in seats, seat structure, seat supports, and/or seat coverings.

The dressing 100' may be used as a preventative dressing. The dressing 100' may be intended for prevention of skin conditions leading to decubitus. The dressing 100' is configured to be an anti-decubitus dressing. The dressing 100' may be arranged to protect certain parts of the body, for example parts subjected to high pressure.

The dressing 100' is intended to contact skin. Contact may be direct, or indirectly with an intervening layer, such as foil, film, sheet, etc., positioned between the dressing 100' and the skin.

The dressing 100' may have any shape. The shape of the dressing 100' may be configured to a part of the body onto which the dressing 100' is intended to be applied. The shape of the dressing 100' may be polygon, such as triangular, quadrilateral such as square or rectangular, pentagon, for example pentagram, hexagon, octagon. The shape of the dressing 100' may be a circular, oval, crescent, asterisk, toroid or obround.

The material of the dressing 100' may be a polymeric material, such as a thermoplastic material. The polymeric material may be an elastomer, for example a thermoplastic elastomer. The polymeric material may be formed of silicone rubber.

The material may have a Shore value measured in the A scale, such as having a Shore value of 30-A to 60-A.

The material may have a bacteriostatic and/or fungistatic properties.

The dressing 100' may be moulded in one part, such as being injection moulded. The dressing 100' may be formed as parts attached to each other.

The dressing 100' may allow for washing, lavage, or treatment with a liquid or gas of a body surface without removal of the dressing 100' from the skin.

The support structure 100 in form of the dressing 100' will now be described in more detail with reference to FIGS. 19*a-e*, which shows cross-sections along line A-A in FIG. 18. The support structure 100' will be referred to as a dressing 100'.

The dressing 100' comprises a base layer 110 having a first surface and a second surface, opposite the first surface. The dressing 100' further comprises a plurality of fingers 102. The fingers 102 extend from the first surface. The fingers 102 extend in an axial direction. The fingers 102 may extend in axial directions being substantially parallel.

The fingers 102 may have a substantially equal length, as measured from the second surface of the base layer 110. Each finger 102 may have a length of 1-10 mm such as 1-5 mm.

The fingers 102 may be positioned on the base layer 110 with a distance between adjacent fingers 102. The distance may be substantially equal between adjacent fingers 102. A distance between adjacent fingers 102 may be 0.5-10 mm such as 2-5 mm.

The fingers 102 may have a circular cross-section. Other shapes are also considered, such as any polygon. The fingers 102 may have a conical shape. The fingers 102 may be solid. In another examples, the fingers 102 may be hollow or tubular.

The base layer 110 has an undulating shape, as seen in cross-section, comprising undulations. Each finger 102 extends from a crest portion 130 of an undulation. A distance between adjacent fingers 102 may be formed by a trough portion 140 of an undulation. The crest portion 130 may be defined as a portion along the undulation having a positive amplitude. The trough portion 140 may be defined as a portion along the undulation having a negative amplitude.

The fingers 102 may extend from the crest of the crest portion 130, i.e., at the highest amplitude of the undulation.

The undulating shape may be a sine formed shape. An amplitude of the undulations may be 1-10 mm such as 1-5 mm. The undulating shape of the layer 110 may be symmetric.

The base layer 110 is provided with openings 113 extending between the first surface and the second surface. Each opening 113 is positioned at the trough portion 140 of an undulation. The openings 113 may have a substantially circular shape. A diameter of the openings 113 may be 1-10 mm such as 1-5 mm. The openings 113 may be positioned at the trough of the trough portion 140, i.e., at the lowest amplitude of the undulation.

The crest portion 130, provided with the finger 102, may be followed by the trough portion 140 provided with the opening 113.

The openings 113 may allow air exchange at the surface of the skin under the dressing 100'. The openings 113 may allow for flow of air or surrounding atmosphere across the base layer 110 and in a direction substantially parallel to the axial direction of the fingers 102, as well as in a direction parallel to the base layer 110. Thereby, ventilation and de-humidification may be obtained, such that skin temperature and moisture levels can be controlled.

The fingers 102 have distal end 121 intended to be in contact with the skin, either directly or through an intervening layer. The distal ends 121 are arranged at a distance from the first surface of the base layer 110. The distal ends 121 may have a half-spherical shape. The distal ends 121 may be convex or have a substantially plane top surface.

The fingers 102 may have a tapered shape. The taper angle may be 1-7°.

If the fingers 102 have a substantially circular cross-section, a diameter of the finger 102 at the distal end 121 may be 1-5 mm such as 2-3 mm.

The distal end 121 of the fingers 2 may have a surface area of at least 1 $mm^2$, such as at least 3 $mm^2$. The surface area of the distal end 121 may be in the range of 1-10 $mm^2$.

A total area of the surface areas of the distal ends 121 of the fingers 102 may be less than 50% of an area of the dressing 100'. The area of the dressing 100 may be defined by the area formed by the outer boundaries of the dressing 100'. The total area of the surface areas of the distal ends 121 of the fingers 102 may be exceeding 10% of an area of dressing 100', such as in the range of 10-50%, for example 20-30%.

At least the distal ends 121 may be adhesive. Before use, the adhesive may be protected by the protective layer 150. In one example, a portion of the fingers 102 may be adhesive. The second surface of the base layer 110 may be free from adhesive.

In one example, the protective layer 150 forms an intervening layer configured to be position between the body or part of body and the fingers 2. In this example, the protective layer 150 is not intended to be removed before use. The protective layer 150 may be porous. The protective layer 150 may be adhesive. A surface of the protective layer 150 configured to face the skin, body part or body may be adhesive. A surface of the protective layer 150 configured to face the fingers 2 may be adhesive.

The dressing 100' may be washable, such as the dressing 100' can be reused. The adhesive properties of the distal ends 121 and/or of the fingers 102 may be maintained after washing. For example, when the material has dried, the material may regain its adhesive properties. The material may be a thermoplastic elastomer or silicone, for example having a Shore value in the 00 scale.

The base layer 110 is intended to be positioned on a support surface, such as for example a bed, mattress, or seat, or be supported by a part of the body. The second surface of the base layer 110 is intended to face the support surface during use. In one example, the dressing 100' is positioned between two body parts, such as between knees, wherein the distal ends 121 of the fingers 102 are in contact with skin of a body part and the lower surface of the base layer 110 is in contact with a supporting body part. The second surface of the base layer 110 may be configured to be moveable on the support surface, such as supporting body part.

The base layer 110 may be configured to match a shape of the underlying support surface. The base layer 110 may be flexible in a direction substantially parallel to the axial direction of the fingers, such as being able to flex, bend, stretch and/or deform to the underlying support surface. In a similar way, the base layer 110 may be flexible in a direction substantially perpendicular to the axial direction of the fingers, such as being able to flex, bend, stretch and/or deform to the underlying support surface. Thereby, the base layer 110 may follow the shape of the underlying support surface.

The fingers 102 may be provided with openings (not shown), which may be arranged on side surfaces and/or in the distal ends 121 of the fingers 102.

In FIG. 19*a*, the dressing 100' is shown when no pressure is applied to the dressing 100'. FIGS. 19*b* and 19*c* shows the dressing 100' when pressure is applied to the dressing 100'

In FIG. 19*b*, pressure is applied on the fingers 102 of the dressing 100' in a direction substantially parallel to the axial direction of the fingers 102, towards the base layer 110. In FIG. 19*b*, the pressure applied is indicated by arrows.

When pressure is applied, the fingers 102 may be compressed in a direction substantially parallel to the axial direction, as shown in FIG. 19*b*.

Further, when pressure is applied, the undulation shape of the base layer 110 may be straighten, such that an amplitude of the undulation under pressure is less than an amplitude of the undulation when no pressure is applied. In one example when pressure is applied, the base layer 110 may have substantially linear extension.

The fingers 102 may be more rigid than the base layer 110. For example, the fingers may be more rigid than the crest portion 130 of the base layer 110. By being more rigid is understood to mean that if a certain defined force is applied to the finger 102 and to the crest portion, respectively, a displacement of the crest portion 130 exceeds a displacement of the finger 102 in a direction substantially parallel to the axial direction of the finger 102. The force applied may compress the finger 102 less than the crest portion 130 in the axial direction.

A displacement of the crest portion 130 of the undulation of the base layer 110 in a direction substantially parallel to the axial direction of the fingers may exceed a compression of the finger in the axial direction.

The fingers 102 may be more rigid, for example by being solid, and the crest portion 130 may have a comparable thinner thickness, such as having a thickness being less than the length of the finger 102.

The crest portion 130 may be provided with reliefs and/or slots, thus reducing the force required for displacement of the crest portion 130 in a direction substantially parallel to the axial direction of the fingers 102. Thus, distribution of regionally varying pressures against the body or of the body against the support surface may be allowed.

The compression and/or movements of the dressing 100' may allow for air circulation, by forcing air to flow through the openings 113. Thereby, circulation may be obtained both in a direction substantially perpendicular to and substantially parallel to the axial direction of the fingers 102.

FIG. 19*c* illustrates how shear on the skin may be reduced by the dressing 100'. In FIG. 19*c*, shear forces are shown by arrows. Shear may be reduced by the fingers 102 following the skin movement, for example by deflecting or deforming. Movements by the fingers 102 on the skin are at least reduced. The dressing 100' at least partly absorbs the shear forces that otherwise would have been absorbed by the skin. The adhesive of the distal ends 121 and/or the finger 102 reduces movements by the fingers 102 on the skin, such that the fingers 102 follows movements of the skin.

The fingers 102 are configured to deform or deflect, in direction substantially perpendicular to the axial direction of the fingers 102. Thereby, the fingers 102 may follow movements of the skin and/or maintain adherence and conformity to the skin of the body part. Shear stress caused in a substantially parallel direction to the plane of the skin of the body part may be at least reduced.

When pressure is applied on the fingers 102, the crest portion 130 of the undulation of the base layer 110 may deform or deflect more than the finger 103 deforms or deflects in a direction substantially parallel to the axial direction of the fingers 102.

The crest portion 130 may have a similar function as the deformable portion previously described.

Further, when pressure is applied on the fingers, a displacement of the crest portion 130 of the undulation of the base layer 110 in a direction substantially perpendicular to the axial direction of the fingers may exceed a displacement of the distal end 121 of the finger 102 in a direction substantially perpendicular to the axial direction. Thereby, adjacent fingers may be separated by a distance even when pressure is applied.

Figure 19D:
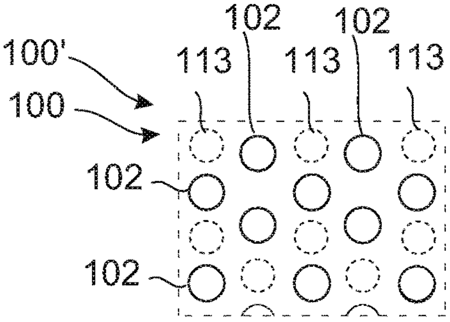
FIGS. 19*d-e* shows examples of the support structure as seen from above.
Figure 19E:
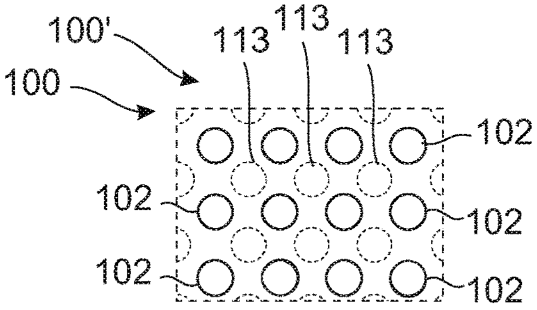

FIGS. 19*d* and 19*e* shows different arrangements of fingers 102 and openings 113, as seen from above, in a portion of the dressing 100'. In the examples shown in FIGS. 19*d* and 19*e*, the fingers 102 are grouped in a group of fingers 102. The fingers 102 are shown by solid lines and the openings 113 are shown with dashed lines in FIGS. 19*d* and 19*e*.

In FIG. 19*d*, the fingers 102 are grouped in groups of three fingers 102. The group of fingers may have a triangular shape. The openings 113 may be arranged between adjacent groups of fingers 102.

In FIG. 19*f*, the fingers 102 are grouped in groups of four fingers 102. The group of fingers may have a quadrangular shape. The openings 113 may be arranged between adjacent groups of fingers 102.

In the examples shown in FIGS. 19*d* and 19*e*, the undulations may have an asymmetric shape. A length of the crest portions 130 may exceed a length of the trough portions 140.

In the examples shown in FIGS. 19*d* and 19*e*, more than one finger 102 may be arranged on one crest portion. 130. In the example shown in FIG. 19*e*, three fingers 102 are extending from one crest portion 130, forming a group of fingers 102. The fingers 102 in FIG. 19*e* are arranged in triangular shape. An opening 113 is arranged between adjacent groups in a trough portion 140. In the example shown in FIG. 19*f*, four fingers 102 are extending from one crest portion 130, forming a group of fingers 102. The fingers 102 in FIG. 19*e* are arranged in rectangular shape. An opening 113 is arranged between adjacent groups in a trough portion 140.

EXAMPLES

1. A support structure (1) for supporting and/or contacting a body or a part of a body, comprising a base layer (10) having a first surface (11) configured to face said body or part of body and a second surface (12) opposite the first surface, a plurality of fingers (2) extending from the first surface (11), each finger (2) extending in an axial direction substantially perpendicular to the first surface (11) and having a distal end (21) configured to support or contact said body or part of body, the fingers (2) being arranged at a distance from each other.

2. A support structure for supporting and/or contacting a body or part of a body, comprising
a base layer comprising raised portions and a base portion extending between the raised portions,
at least one finger extending from the raised portion of the base layer, said at least one finger extending in an axial direction substantially perpendicular to the base layer and having a distal end configured to support and/or contact said body or part of body,
wherein the raised portions are arranged at a distance from the base portion in a direction parallel to the axial direction.
3. A support structure for supporting and/or contacting a body or part of a body, comprising
a base layer having a first surface configured to face said body or part of body, and a second surface opposite the first surface,
wherein the base layer comprises a first set of openings extending between the first surface and the second surface,
a plurality of fingers extending from the first surface, each finger extending in an axial direction substantially perpendicular to the first surface and having a distal end configured to support and/or contact said body or part of body, the fingers being arranged at a distance from each other,
a second set of openings arranged in the fingers, or in raised portions of the base layer, wherein the second set of openings are arranged at distance from the first set of openings in a direction parallel to the axial direction.
4. A support structure for supporting and/or contacting a body or part of a body, comprising
a base layer having a first surface configured to face said body or part of body, and a second surface opposite the first surface,
a plurality of fingers extending from the first surface, each finger extending in an axial direction substantially perpendicular to the first surface and having a distal end configured to support and/or contact said body or part of body, the fingers being arranged at a distance from each other, wherein the fingers are arranged in groups of fingers.
5. A support structure for supporting and/or contacting a body or a part of a body, comprising
a base layer having a first surface configured to face said body or part of body, and a second surface opposite the first surface,
a plurality of fingers extending from the first surface, each finger extending in an axial direction substantially perpendicular to the first surface and having a distal end configured to support and/or contact said body or part of body, the fingers being arranged at a distance from each other,
wherein a deformable portion of the base layer surrounding the finger is provided with a perforations.
6. A support structure for supporting and/or contacting a body or a part of a body, comprising
a base layer having a first surface configured to face said body or part of body, and a second surface opposite the first surface,
a plurality of fingers extending from the first surface, each finger extending in an axial direction substantially perpendicular to the first surface and having a distal end configured to support and/or contact said body or part of body, the fingers being arranged at a distance from each other,
wherein adjacent fingers are connected by a distancing arm extending from one finger to an adjacent finger.
7. A support structure for supporting and/or contacting a body or a part of a body, comprising
a base layer having a first surface configured to face said body or part of body, and a second surface opposite the first surface,
a plurality of fingers extending from the first surface, each finger extending in an axial direction substantially perpendicular to the first surface and having a distal end configured to support and/or contact said body or part of body, the fingers being arranged at a distance from each other,
wherein at least along an edge of the support structure, the distal ends of fingers arranged adjacent said edge has a surface area exceeding a surface area of distal ends of fingers arranged a centre portion of the support structure.
8. A support structure for supporting and/or contacting a body or a part of a body, comprising
a base layer having a first surface configured to face said body or part of body, and
a plurality of fingers extending from the first surface, each finger extending in an axial direction substantially perpendicular to the first surface and having a distal end configured to support and/or contact said body or part of body, the fingers being arranged at a distance from each other,
wherein along a first edge of the base layer, the base layer is provided with openings extending from the first surface to the second surface, the openings being configured to receive fingers arranged along an edge of an adjacent support structure, or fingers arranged on an adjacent device to connect the support structure to an adjacent support structure or to an adjacent device.
9. A support structure for supporting and/or contacting a body or a part of a body, comprising:
a base layer having a first surface configured to face said body or part of body and a second surface opposite the first surface,
the support structure comprises at least one first portion and at least one second portion, wherein, in said at least one portion of the support structure, a first type of fingers extends from the base layer, and in said at least one second portion of the support structure, a second type of fingers extends from the base layer, the first type of fingers being different from the second type fingers.
10. The support structure according to example 9, wherein a planar extension of the finger of the first type in a direction substantially parallel to an extension of the base layer is less than a height of the finger in a direction substantially perpendicular to the extension of base layer.
11. The support structure according to example 9 or 10, wherein a planar extension of the finger of the second type in a direction substantially parallel to a plane of the base layer exceeds a height of the finger in a direction substantially perpendicular to the plane of base layer.
12. The support structure according to any one of the preceding examples, wherein each finger (2) is more rigid than a deformable portion (10*b*) of the base layer (10), the deformable portion (10*b*) surrounding said finger (2).
13. The support structure according to any one of the preceding examples, wherein under pressure applied by or on the body or part of body on the fingers, the plurality of fingers (2) deflects in a direction substantially perpendicular to an axial direction of the fingers.

14. The support structure according to any one of the preceding examples, wherein under pressure applied by or on the body or part of body on the fingers, the fingers (2) are substantially parallel.

15. A support structure according to any one of the preceding examples, wherein the base layer (10) comprises a plurality of said deformable portions (10*b*) and a plurality of intermediary portions (15) from which the fingers (2) extend, the deformable portions (10*b*) being more flexible than the intermediary portions (15).

16. The support structure according to any one of the preceding examples, wherein under pressure applied by or on the body or part of body, deformation of the deformable portion (10*b*) of the base layer (10) is exceeding deformation of the finger (2).

17. The support structure according to any one of the preceding examples, wherein under pressure applied by or on the body or part of body, a displacement of the deformable portion (10*b*) of the base layer (10) in a direction parallel to the axial direction exceeds a compression of the finger (2) in the axial direction.

18. The support structure according to any one of the preceding examples, wherein under pressure applied by or on the body or part of body, a displacement of the deformable portion (10*b*) of the base layer (10) in a direction perpendicular to the axial direction is exceeding a displacement of the distal end (21) of the finger (2) in a direction perpendicular to the axial direction such that adjacent fingers (2) are separated by a distance (D2).

19. The support structure according to any one of the preceding examples, wherein when no pressure is applied, the deformable portion (10*b*) of the base layer (10) has a substantially planar extension, and under pressure applied by or on the body or part of body, the deformable portion (10*b*) of the base layer (10) has a concavely curved shape as seen from the first surface (11).

20. The support structure according to any one of the preceding examples, wherein the base layer (10) comprises a base portion (10*a*) and raised portions (30) arranged at a distance from the base portion (10*a*) in direction parallel to the axial direction, wherein at least one of said fingers (2) extend from the raised portions (30).

21. The support structure according to example 18, wherein the raised portion (30) forms the deformable portion (10*b*) of the base layer (10).

22. The support structure according to examples 2 and 18-19, wherein, under pressure applied by or on the body or part of body, deformation of the raised portion exceeds deformation of the finger.

23. The support structure according to examples 2 and 18-20, wherein, under pressure applied by or on the body or part of body, a displacement of the raised portion in a direction parallel to the axial direction exceeds a compression of the finger in the axial direction.

24. The support structure according to examples 18-21, wherein at least one of said fingers (2) is arranged in a first group of fingers (2) extending from a first raised portion of said raised portions (30), and at least one of said fingers (2) is arranged in a second group of fingers (2) extending from a second raised portion of said raised portions (30).

25. The support structure according to example 22, wherein a number of fingers in the first group and/or second group is 3-12.

26. The support structure according to any one of the preceding examples, wherein a ratio between a thickness of the deformable portion (10*b*) of the base layer (10) to a length of the finger (2) is at least 1:5.

27. The support structure according to any one of the preceding examples, wherein a total area of the distal ends (21) of the fingers (2) is less than 50% of a total area of the support structure (1).

28. The support structure according to any one of the preceding examples, wherein a material forming said fingers (2) has a Shore D value of at least 25.

29. The support structure according to any one of the preceding examples, wherein the finger (2) has a substantially circular cross-section having a diameter, wherein a ratio between the diameter at the distal end (21) of the finger (2) and a length of the finger (2) is at least 1:2.

30. The support structure according to any one of the preceding examples, wherein the finger (2) has a substantially circular cross-section having a diameter, wherein a ratio between the diameter at the distal end (21) of the finger (2) and a distance between adjacent fingers (2) is at least 1:2.

31. The support structure according to any one of the preceding examples, wherein a ratio between a distance between adjacent fingers (2) to a length of the finger (2) to is at least 1:2.

32. The support structure according to any one of the preceding examples, wherein the base portion (10*a*) comprises at least one first opening (13).

33. The support structure according to any one of the preceding examples, further comprising at least one second opening (31) positioned in the finger (2) and/or in the raised portion (30).

34. The support structure according to any one of the preceding examples, wherein the deformable portion (10*b*) of the base layer (10) comprises a plurality of perforations (32).

35. The support structure according to any one of the preceding examples, wherein a planar extension of the finger in a direction substantially parallel to a plane of the base layer exceeds a height of the finger in a direction substantially perpendicular to the plane of base layer.

36. The support structure according to any one of examples 1-32, wherein a planar extension of the finger in a direction substantially parallel to an extension of the base layer is less than a height of the finger in a direction substantially perpendicular to the extension of base layer.

37. The support structure according to any one of the preceding examples, wherein the fingers are arranged in groups of fingers.

38. The support structure according to example 3 and 35, wherein a number of fingers in a first group and/or in second group may be 2-12.

39. The support structure according to any one of the preceding examples, wherein a number of said fingers being connected by distancing arms form a group of fingers.

40. The support structure according to any one of the preceding examples, wherein at least one finger is more rigid than a deformable portion of the base layer, the deformable portion surrounding said finger.

41. A support structure (100), comprising a base layer (110) having a first surface and a second surface, opposite the first surface, a plurality of fingers (102) extending from the first surface of the base layer (110), wherein each finger (102) has a distal end (121) configured to form a skin contacting surface, directly or indirectly, wherein the base layer (110), as seen in cross section, has an undulating shape having undulations, wherein each finger (102) extends from a crest portion (130) of an undulation of the base layer.
42. The support structure according to example 41, wherein the support structure is a dressing (100').
43. The support structure according to example 41 or 42, wherein the undulating shape is sine wave shaped.
44. The support structure according to any one of examples 41-43, wherein the base layer (110) is provided with at least one opening (113), wherein said at least opening (113) extends between the first surface and the second surface of the base layer (110) at a trough portion (140) of the undulation of the base layer (110).
45. The support structure according to any one of examples 41-44, wherein at least the distal ends (121) of the fingers (102) are adhesive.
46. The support structure according to any one of examples 41-45, wherein the fingers (102) extend from the base layer (110) in a direction substantially perpendicular to the base layer (110).
47. The support structure according to any one of examples 41-46, wherein the fingers (102) are more rigid than the crest portion (130) of the undulations of the base layer (110).
48. The support structure according to any one of examples 41-47, wherein the base layer (110) is flexible in a direction substantially parallel to the extension of the fingers (102).
49. The support structure according to any one of examples 41-48, wherein the base layer (110) is flexible in a direction substantially perpendicular to the extension of the fingers (102).
50. The support structure according to any one of examples 41-49, wherein, when pressure is applied on the fingers (102), the fingers (102) are configured to deflect in a direction substantially perpendicular to an axial direction of the fingers (102).
51. The support structure according to any one of examples 41-50, wherein, when pressure is applied on the fingers (102), deflection of the crest portion (130) of the undulation of the base layer (110) is exceeding deflection of the finger (102), in a direction substantially parallel to the axial direction of the fingers (102).
52. The support structure according to any one of examples 41-51, wherein, when pressure is applied on the fingers (102) a displacement of the crest portion (130) of the undulation of the base layer (110) in a direction substantially parallel to the axial direction of the fingers (102) exceeds compression of the finger (102) in the axial direction.
53. The support structure according to any one of examples 41-52, wherein, when pressure is applied on the fingers (102), a displacement of the crest portion (130) of the undulation of the base layer (110) in a direction substantially perpendicular to the axial direction of the fingers (102) is exceeding a displacement of the distal end (121) of the finger (102) in a direction substantially perpendicular to the axial direction.
54. The support structure according to any one of examples 41-53, wherein a material forming at least a part of support structure is silicone.
55. A support arrangement (80), comprising:

a core layer (81), a first support structure (1), the first support structure being according to any one of the preceding examples, wherein the support structure (1) is arranged on the core layer (81), a cover (83) at least partially covering the support structure (1).

56. The support arrangement according to example 55, further comprising a second support structure partially covering the first support structure.
57. The support arrangement according to example 56, wherein the second support structure comprises a plurality of protuberances facing the fingers of the first support structure.

The invention claimed is:

1. A support structure for supporting and/or contacting a body or a part of a body, comprising: a base layer having a first surface configured to face said body or part of body and a second surface opposite the first surface, a plurality of fingers extending from the first surface, wherein the base layer, as seen in cross section, has an undulating shape having undulations, wherein each finger extends from a crest portion of an undulation of the base layer, wherein the plurality of fingers are integrally formed with the base layer, each finger extending in an axial direction substantially perpendicular to the first surface and having a distal end configured to support or contact said body or part of body, the fingers being arranged at a distance from each other, wherein each finger is more rigid than a deformable portion of the base layer, the deformable portion surrounding said finger, wherein the base layer comprises a plurality of said deformable portions and a plurality of intermediary portions from which the fingers extend, the deformable portions being more flexible than the intermediary portions.

2. The support structure according to claim 1, wherein under pressure applied by or on the body or part of body, deformation of the deformable portion of the base layer exceeds deformation of the finger.

3. The support structure according to claim 1, wherein under pressure applied by or on the body or part of body, a displacement of the deformable portion of the base layer in a direction parallel to the axial direction exceeds a compression of the finger in the axial direction.

4. The support structure according to claim 1, wherein under pressure applied by or on the body or part of body, a displacement of the deformable portion of the base layer in a direction perpendicular to the axial direction exceeds a displacement of the distal end of the finger in a direction perpendicular to the axial direction such that adjacent fingers are separated by a distance.

5. The support structure according to claim 1, wherein when no pressure is applied, the deformable portion of the base layer has a substantially planar extension, and under pressure applied by or on the body or part of body, the deformable portion of the base layer has a concavely curved shape as seen from the first surface.

6. The support structure according to claim 1, wherein the base layer comprises a base portion and raised portions arranged at a distance from the base portion in a direction parallel to the axial direction, wherein at least one of said fingers extends from the raised portions.

7. The support structure according to claim 6, wherein the raised portion forms the deformable portion of the base layer.

8. The support structure according to claim 1, wherein a ratio between a thickness of the deformable portion of the base layer and a length of the finger is at least 1:5.

9. The support structure according to claim 1, wherein a total area of the distal ends of the fingers is less than 50% of a total area of the support structure.

10. The support structure according to claim 1, wherein a material forming said fingers has a Shore D value of at least 25.

11. The support structure according to claim 1, wherein the finger has a substantially circular cross-section having a diameter, wherein a ratio between the diameter at the distal end of the finger and a length of the finger is at least 1:2.

12. The support structure according to claim 1, wherein the finger has a substantially circular cross-section having a diameter, wherein a ratio between the diameter at the distal end of the finger and a distance between adjacent fingers is at least 1:2.

13. The support structure according to claim 1, wherein a ratio between a distance between adjacent fingers and a length of the finger is at least 1:2.

14. The support structure according to claim 1, wherein the base layer comprises at least one first opening.

15. The support structure according to claim 1, further comprising at least one second opening positioned in the finger and/or in the raised portion.

16. A support arrangement, comprising:

a core layer, a support structure according to claim 1, wherein the support structure is arranged on the core layer, a cover at least partially covering the support structure.

17. A support structure for skin contact, comprising a base layer having a first surface and a second surface, opposite the first surface, a plurality of fingers extending from the first surface of the base layer, wherein each finger has a distal end configured to form a skin contacting surface, wherein the base layer, as seen in cross section, has an undulating shape having undulations, wherein each finger extends from a crest portion of an undulation of the base layer, and wherein each finger is configured such that, when pressure is applied on the plurality of fingers, deflection of the crest portion of the undulation of the base layer exceeds deflection of the finger, in a direction substantially parallel to an axial direction of the finger and the fingers are configured to deflect in a direction substantially perpendicular to the axial direction of the finger.

18. The support structure according to claim 17, wherein the support structure is a dressing.

19. The support structure according to claim 17, wherein the undulating shape is sine wave shaped.

20. The support structure according to claim 17, wherein the base layer is provided with at least one opening, wherein said at least one opening extends between the first surface and the second surface of the base layer at a trough portion of the undulation of the base layer.

21. The support structure according to claim 17, wherein at least the distal ends of the fingers are adhesive.

22. The support structure according to claim 17, wherein the fingers extend from the base layer in a direction substantially perpendicular to the base layer.

23. The support structure according to claim 17, wherein the fingers are more rigid than the crest portion of the undulations of the base layer.

24. The support structure according to claim 17, wherein the base layer is flexible in a direction substantially parallel to the extension of the fingers.

25. The support structure according to claim 17, wherein the base layer is flexible in a direction substantially perpendicular to the extension of the fingers.

26. The support structure according to claim 17, wherein, when pressure is applied on the fingers, a displacement of the crest portion of the undulation of the base layer in a direction substantially parallel to the axial direction of the fingers exceeds compression of the finger in the axial direction.

27. The support structure according to claim 17, wherein, when pressure is applied on the fingers, a displacement of the crest portion of the undulation of the base layer in a direction substantially perpendicular to the axial direction of the fingers exceeds a displacement of the distal end of the finger in a direction substantially perpendicular to the axial direction.

28. A support structure for supporting and/or contacting a body or a part of a body, comprising: a base layer having a first surface configured to face said body or part of body and a second surface opposite the first surface, a plurality of fingers extending from the first surface, wherein the plurality of fingers are integrally formed with the base layer, wherein the base layer, as seen in cross section, has an undulating shape having undulations, wherein each finger extends from a crest portion of an undulation of the base layer, each finger extending in an axial direction substantially perpendicular to the first surface and having a distal end configured to support or contact said body or part of body, the fingers being arranged at a distance from each other, wherein each finger is more rigid than a deformable portion of the base layer, the deformable portion surrounding said finger, wherein the base layer comprises a plurality of said deformable portions and a plurality of intermediary portions from which the fingers extend, the deformable portions being more flexible than the intermediary portions, the intermediary portions each extending from the first surface of the base layer to a respective one of the plurality of fingers.

* * * * *